US009979036B2

(12) United States Patent
Morita et al.

(10) Patent No.: US 9,979,036 B2
(45) Date of Patent: May 22, 2018

(54) HYDROGEN GENERATING APPARATUS, FUEL CELL SYSTEM, AND METHODS OF OPERATING THEM

(71) Applicant: Panasonic Corporation, Osaka (JP)

(72) Inventors: Junji Morita, Kyoto (JP); Akinori Yukimasa, Osaka (JP); Hisanori Ishino, Osaka (JP); Jun Yoshida, Hyogo (JP); Hiroaki Fujii, Nara (JP)

(73) Assignee: PANASONIC CORPORATION, Osaka (JP)

(*) Notice: Subject to any disclaimer, the term of this patent is extended or adjusted under 35 U.S.C. 154(b) by 599 days.

(21) Appl. No.: 14/583,149

(22) Filed: Dec. 25, 2014

(65) Prior Publication Data

US 2015/0207162 A1    Jul. 23, 2015

(30) Foreign Application Priority Data

Jan. 21, 2014    (JP) .................................. 2014-008712

(51) Int. Cl.
*B01J 19/24*    (2006.01)
*C01B 3/02*    (2006.01)
(Continued)

(52) U.S. Cl.
CPC ......... *H01M 8/0618* (2013.01); *B01J 19/245* (2013.01); *C01B 3/02* (2013.01);
(Continued)

(58) Field of Classification Search
CPC ............ B01J 19/245; B01J 2219/00164; B01J 2219/24; C01B 2203/0233;
(Continued)

(56) References Cited

U.S. PATENT DOCUMENTS

2010/0330444 A1* 12/2010 Kani ................... C01B 3/384
429/423
2012/0040256 A1* 2/2012 Kani ................... C01B 3/384
429/410
(Continued)

FOREIGN PATENT DOCUMENTS

JP    2003-306309    10/2003
JP    2013-222573    10/2013
(Continued)

OTHER PUBLICATIONS

The Extended European Search Report dated Jun. 9, 2015 for the related European Patent Application No. 15150060.0.

*Primary Examiner* — Sarah A. Slifka
*Assistant Examiner* — Lilia Nedialkova
(74) *Attorney, Agent, or Firm* — McDermott Will & Emery LLP

(57) ABSTRACT

A hydrogen generating apparatus includes a reformer generating hydrogen-containing gas through a reforming reaction, a raw material supplier supplying a raw material to the reformer, a reaction gas supplier supplying reaction gas other than the raw material to the reformer, a hydro-desulfurizer removing a sulfur compound in the raw material supplied to the reformer, a recycle flow passage through which part of the hydrogen-containing gas generated by the reformer is supplied to the hydro-desulfurizer, a closing device that closes the recycle flow passage, and a controller that, when stopping operation, closes the closing device and controls the raw material supplier and the reaction gas supplier such that the raw material and the reaction gas are supplied to the reformer, before a temperature of the reformer drops down to a temperature at which deposition of carbon from the raw material on a reformation catalyst disposed inside the reformer is suppressed.

16 Claims, 7 Drawing Sheets

(51) Int. Cl.
  *H01M 8/06* (2016.01)
  *H01M 8/0612* (2016.01)
  *H01M 8/0662* (2016.01)
  *C01B 3/32* (2006.01)
  *C01B 3/38* (2006.01)

(52) U.S. Cl.
  CPC ................ C01B 3/323 (2013.01); C01B 3/38 (2013.01); H01M 8/0631 (2013.01); H01M 8/0675 (2013.01); *B01J 2219/00164* (2013.01); *B01J 2219/24* (2013.01); *C01B 2203/0233* (2013.01); *C01B 2203/0244* (2013.01); *C01B 2203/0261* (2013.01); *C01B 2203/0283* (2013.01); *C01B 2203/044* (2013.01); *C01B 2203/0445* (2013.01); *C01B 2203/066* (2013.01); *C01B 2203/0811* (2013.01); *C01B 2203/1058* (2013.01); *C01B 2203/1064* (2013.01); *C01B 2203/127* (2013.01); *C01B 2203/1217* (2013.01); *C01B 2203/1223* (2013.01); *C01B 2203/1235* (2013.01); *C01B 2203/1241* (2013.01); *C01B 2203/1247* (2013.01); *C01B 2203/1288* (2013.01); *C01B 2203/148* (2013.01); *C01B 2203/1604* (2013.01); *C01B 2203/169* (2013.01); *C01B 2203/1609* (2013.01); *C01B 2203/1633* (2013.01)

(58) Field of Classification Search
  CPC .... C01B 2203/0244; C01B 2203/0261; C01B 2203/0283; C01B 2203/044; C01B 2203/0445; C01B 2203/066; C01B 2203/0811; C01B 2203/1058; C01B 2203/1064; C01B 2203/1217; C01B 2203/1223; C01B 2203/1235; C01B 2203/1241; C01B 2203/127; C01B 2203/1288; C01B 2203/148; C01B 2203/1604; C01B 2203/1609; C01B 2203/1633; C01B 2203/169; C01B 3/02; C01B 3/323; C01B 3/38; H01M 8/0618; H01M 8/0631; H01M 8/0675
  See application file for complete search history.

(56) References Cited

U.S. PATENT DOCUMENTS

| 2012/0178006 | A1 | 7/2012 | Kani et al. | |
| 2012/0231359 | A1* | 9/2012 | Fuju | C01B 3/384 429/420 |
| 2014/0050996 | A1 | 2/2014 | Tamura et al. | |
| 2014/0072888 | A1* | 3/2014 | Harada | H01M 8/0612 429/410 |

FOREIGN PATENT DOCUMENTS

| WO | 2011/077752 | 6/2011 | |
| WO | WO 2012164897 A1 * | 12/2012 | .......... H01M 8/0612 |
| WO | 2013/128785 | 9/2013 | |

* cited by examiner

HYDROGEN GENERATING APPARATUS, FUEL CELL SYSTEM, AND METHODS OF OPERATING THEM

BACKGROUND

1. Technical Field

The present disclosure relates to a hydrogen generating apparatus, a fuel cell system, and methods of operating them.

2. Description of the Related Art

Because infrastructures to supply hydrogen-containing gas are not yet built up on the widespread basis, equipment using the hydrogen-containing gas as fuel, represented by a fuel cell system, usually includes a hydrogen generating apparatus equipped with a reformer for generating the hydrogen-containing gas from a raw material, e.g., natural gas or LPG, which is prevailed as general raw-material infrastructure gas.

The raw material may contain a sulfur compound as an odorant. Because the sulfur compound is particularly a poisoning material for a reformation catalysis, it has to be removed from the raw material by any method. There is provided a hydrogen generating apparatus that employs a method of recycling part of the generated hydrogen-containing gas and removing the sulfur compound through hydrodesulfurization.

International Publication No. 2011/077752 discloses a hydrogen generating apparatus including a first desulfurizer that adsorptively removes a sulfur compound in a raw material gas supplied to a reformer, a second desulfurizer that performs hydrodesulfurization of the sulfur compound in the raw material gas supplied to the reformer, a first passage through which the raw material gas is supplied to the reformer via the first desulfurizer, a second passage through which the raw material gas is supplied to the reformer via the second desulfurizer, but not via the first desulfurizer, a switching device that switches over the first passage and the second passage, and a controller, wherein the controller controls the switching device such that the raw material gas flows through the first passage during at least one of a pressure supplementing operation for replenishing the raw material gas to compensate for an internal pressure drop after an operation of generating the hydrogen-containing gas and a raw-material gas purging operation of purging the inside of the hydrogen generating apparatus with the raw material gas.

SUMMARY

An object of the present disclosure is to reduce a decrease in the activities of a hydrodesulfurization catalyst in a hydrogen generating apparatus including a hydro-desulfurizer.

In view of the above-described situation, one non-limiting and exemplary embodiment provides a hydrogen generating apparatus that reduce a decrease in the activities of the hydrodesulfurization catalyst in comparison with the related art.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

According to one aspect of the present disclosure, there is provided a hydrogen generating apparatus including a reformer that generates hydrogen-containing gas through a reforming reaction, a raw material supplier that supplies a raw material to the reformer, a reaction gas supplier that supplies reaction gas other than the raw material to the reformer, a hydro-desulfurizer that removes a sulfur compound in the raw material supplied to the reformer, a recycle flow passage through which part of the hydrogen-containing gas generated by the reformer is supplied to the hydro-desulfurizer, a closing device that closes the recycle flow passage, and a controller configured to, when stopping operation of the hydrogen generating apparatus, close the closing device and control the raw material supplier and the reaction gas supplier such that the raw material and the reaction gas other than the raw material are supplied to the reformer, before a temperature of the reformer drops down to a temperature at which deposition of carbon from the raw material on a reformation catalyst disposed inside the reformer is suppressed.

These general and specific aspects may be implemented using a system and a method, and any combination of systems and methods.

With the one aspect of the present disclosure, an advantageous effect of reducing a decrease in the activities of the hydrodesulfurization catalyst can be obtained in the hydrogen generating apparatus including the hydro-desulfurizer.

DETAILED DESCRIPTION

Figure 1:
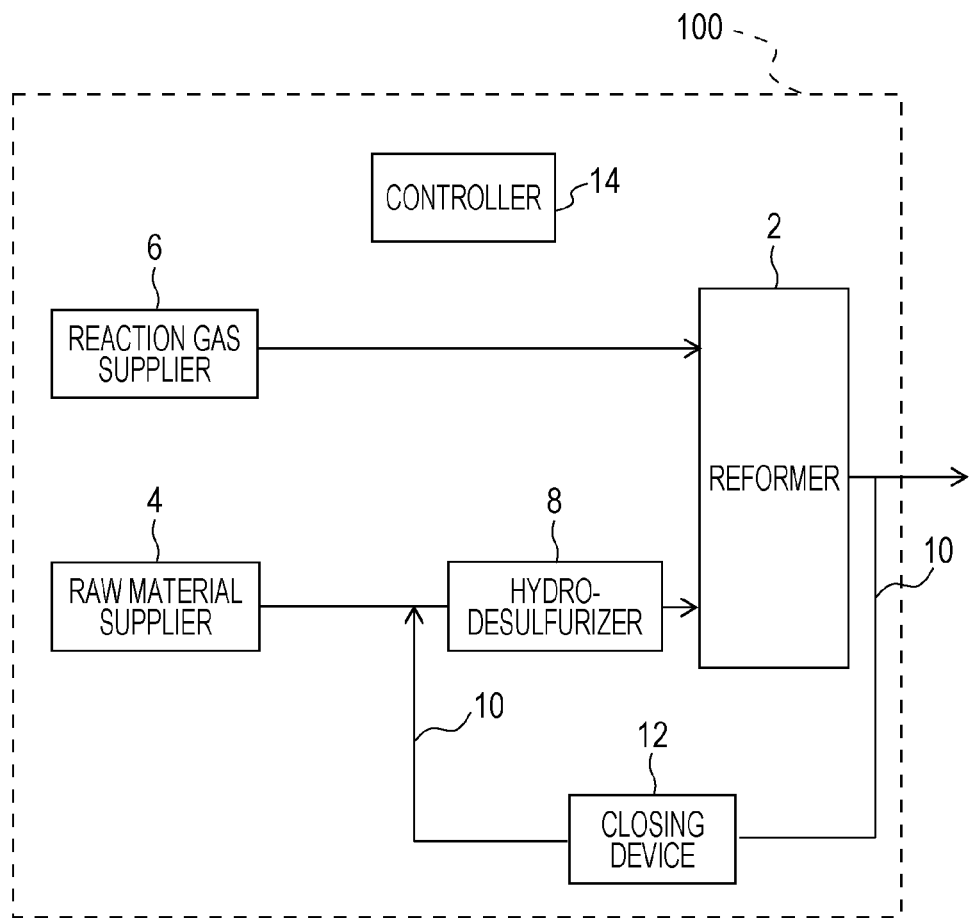
FIG. 1 is a block diagram illustrating one example of a basic configuration of a hydrogen generating apparatus according to a first embodiment.

The inventors have conducted intensive studies on configurations to reduce a decrease in the activities of a hydrodesulfurization catalyst in a hydrogen generating apparatus including a hydro-desulfurizer. As a result, the following findings are attained.

Part of hydrogen-containing gas delivered from a reformer is recycled and supplied to a hydro-desulfurizer. The hydrogen-containing gas contains a considerable amount of steam. The inventors have found that, when operation is stopped in a state where the hydrogen-containing gas remains inside the hydro-desulfurizer, steam in the hydrogen-containing gas is condensed with a temperature drop, thereby decreasing the activities of a hydrodesulfurization catalyst.

In the hydrogen generating apparatus disclosed in the above-cited International Publication No. 2011/077752, when raw material purge is performed, the inside of the hydro-desulfurizer is also purged with a raw material. Accordingly, steam remaining inside the hydro-desulfurizer is swept away by the raw material purge. However, because the raw material purge is performed at temperature at which deposition of carbon is suppressed in the reformer, steam is condensed in the hydro-desulfurizer in which temperature is controlled to a level lower than that in the reformer, thus causing a possibility that the activities of the hydrodesulfurization catalyst may decrease. By purging the inside of the hydro-desulfurizer with the raw material before reaching the temperature at which deposition of carbon is suppressed in the reformer, it is expected that an amount of water condensed in the hydro-desulfurizer is reduced in comparison with the amount of condensed water in the hydrogen generating apparatus disclosed in the above-cited International Publication No. 2011/077752. However, there is a possibility that, when the raw material is supplied at the above-mentioned temperature to the hydro-desulfurizer, deposition of carbon may occur from the raw material in the reformer.

On the other hand, in the reformer, a reforming action is progressed by supplying not only the raw material, but also reaction gas other than the raw material. Thus, carbonation of the raw material is suppressed in the reformer or a device installed downstream of the reformer.

On the basis of the above-described findings, the inventors have conceived the following features of the present disclosure.

A first aspect of the present disclosure provides a hydrogen generating apparatus including a reformer that generates hydrogen-containing gas through a reforming reaction, a raw material supplier that supplies a raw material to the reformer, a reaction gas supplier that supplies reaction gas other than the raw material to the reformer, a hydro-desulfurizer that removes a sulfur compound in the raw material supplied to the reformer, a recycle flow passage through which part of the hydrogen-containing gas generated by the reformer is supplied to the hydro-desulfurizer, a closing device that closes the recycle flow passage, and a controller configured to, when stopping operation of the hydrogen generating apparatus, close the closing device and control the raw material supplier and the reaction gas supplier such that the raw material and the reaction gas other than the raw material are supplied to the reformer, before a temperature of the reformer drops down to a temperature at which deposition of carbon from the raw material on a reformation catalyst disposed inside the reformer is suppressed.

With the features described above, an amount of water condensed in the hydro-desulfurizer can be reduced and a decrease in the activities of a hydrodesulfurization catalyst can be reduced in comparison with the related art, while deposition of carbon in the reformer is suppressed. Moreover, since the above-mentioned control is executed in the state where the recycle flow passage is closed, steam remaining in the recycle flow passage is inhibited from flowing into the hydro-desulfurizer, and the amount of water condensed in the hydro-desulfurizer is further reduced.

According to a second aspect of the present disclosure, in the hydrogen generating apparatus according to the first aspect, the hydro-desulfurizer may include therein a hydrodesulfurization catalyst, the hydrodesulfurization catalyst being a catalyst that adsorptively removes the sulfur compound in the raw material even when the hydrogen-containing gas is not supplied through the recycle flow passage.

With the features described above, even when the closing device is closed in procedures for stopping the operation, the sulfur compound in the raw material supplied to the reformer can be removed.

A third aspect of the present disclosure provides a hydrogen generating apparatus further including an adsorbent desulfurizer that adsorptively removes the sulfur compound in the raw material upstream of the hydro-desulfurizer, a first material supplying passage through which the raw material supplied to the reformer via the adsorbent desulfurizer and the hydro-desulfurizer flows, a second material supplying passage through which the raw material supplied to the reformer via the hydro-desulfurizer, but not via the adsorbent desulfurizer, flows, and a switching device that switches over the first material supplying passage and the second material supplying passage, wherein, when stopping the operation of the hydrogen generating apparatus, the controller switches over the switching device such that the raw material flows through the first material supplying passage, closes the closing device, and controls the raw material supplier and the reaction gas supplier such that the raw material and the reaction gas other than the raw material are supplied to the reformer, before the temperature of the reformer drops down to the temperature at which deposition of carbon from the raw material on the reformation catalyst disposed inside the reformer is suppressed.

With the features described above, even after the supply of hydrogen to the hydro-desulfurizer is stopped, the raw material having been desulfurized by the adsorbent desulfurizer can be supplied to the reformer, and poisoning of the reformation catalyst caused by the sulfur compound can be reduced.

According to a fourth aspect of the present disclosure, in the hydrogen generating apparatus according to any one of the first to third aspects, when stopping the operation of the hydrogen generating apparatus, the controller may control the raw material supplier and the reaction gas supplier such that, at least until inside of the hydro-desulfurizer is purged with the raw material, the raw material and the reaction gas other than the raw material are supplied to the reformer, before the temperature of the reformer drops down to the temperature at which deposition of carbon from the raw material on the reformation catalyst disposed inside the reformer is suppressed.

With the feature described above, the decrease in the activities of the hydrodesulfurization catalyst can be more effectively reduced in the hydrogen generating apparatus including the hydro-desulfurizer.

According to a fifth aspect of the present disclosure, in the hydrogen generating apparatus according to any one of the first to fourth aspects, after executing the aforesaid control, when a temperature of the reformation catalyst disposed inside the reformer becomes the temperature at which deposition of carbon from the raw material is suppressed, the controller may control the raw material supplier to purge inside of the reformer with the raw material.

With the feature described above, in the hydrogen generating apparatus including the hydro-desulfurizer, the decrease in the activities of the hydrodesulfurization catalyst can be reduced in comparison with the related art, while deposition of carbon in the reformation catalyst is suppressed. Moreover, since the above-mentioned control is executed in the state where the recycle flow passage is closed, the steam remaining in the recycle flow passage is inhibited from flowing into the hydro-desulfurizer, and the amount of water condensed in the hydro-desulfurizer is further reduced.

A sixth aspect of the present disclosure provides a fuel cell system including the hydrogen generating apparatus according to any one of the first to fifth aspects, and a fuel cell that generates electric power by employing the hydrogen-containing gas supplied from the hydrogen generating apparatus.

With the features described above, in the fuel cell system including the hydrogen generating apparatus equipped with the hydro-desulfurizer, the amount of water condensed in the hydro-desulfurizer can be reduced and the decrease in the activities of the hydrodesulfurization catalyst can be reduced in comparison with the related art, while deposition of carbon in the reformer is suppressed. Moreover, since the above-mentioned control is executed in the state where the recycle flow passage is closed, the steam remaining in the recycle flow passage is inhibited from flowing into the hydro-desulfurizer, and the amount of water condensed in the hydro-desulfurizer is further reduced.

According to a seventh aspect of the present disclosure, the fuel cell system according to the sixth aspect may further include a power conditioner that conditions electric power generated by the fuel cell, wherein the controller may control the power conditioner such that the fuel cell generates electric power, in a state where, when stopping the operation of the fuel cell system, the controller closes the closing device and controls the raw material supplier and the reaction gas supplier such that the raw material and the reaction gas other than the raw material are supplied to the reformer, before the temperature of the reformer drops down to the temperature at which deposition of carbon from the raw material on the reformation catalyst disposed inside the reformer is suppressed.

With the features described above, decreases in the respective activities of the hydrodesulfurization catalyst, the reformation catalyst, and an electrode catalyst in the fuel cell can be reduced in the fuel cell system including the hydro-desulfurizer.

An eighth aspect of the present disclosure provides a fuel cell system including the hydrogen generating apparatus according to the fifth aspect, and a fuel cell that generates electric power by employing the hydrogen-containing gas supplied from the hydrogen generating apparatus, wherein, when inside of the reformer is purged with the raw material, the raw material having passed through the reformer is supplied to the fuel cell to purge inside of the fuel cell with the raw material.

With the features described above, the decreases in the respective activities of the reformation catalyst and the electrode catalyst can be reduced. Moreover, since the above-mentioned control is executed in the state where the recycle flow passage is closed, the steam remaining in the recycle flow passage is inhibited from flowing into the hydro-desulfurizer, and the amount of water condensed in the hydro-desulfurizer is further reduced.

A ninth aspect of the present disclosure provides a method for operating a hydrogen generating apparatus, the method including a step (a) of, when stopping operation of the hydrogen generating apparatus, closing a recycle flow passage through which part of hydrogen-containing gas generated in a reformer through a reforming reaction is supplied to a hydro-desulfurizer, and supplying a raw material to the hydro-desulfurizer, before a temperature of the reformer drops down to a temperature at which deposition of carbon from the raw material on a reformation catalyst disposed inside the reformer is suppressed, and a step (b) of, during execution of the step (a), supplying the raw material having passed through the hydro-desulfurizer and reaction gas, which is used for the reforming reaction, other than the raw material to the reformer, and generating the hydrogen-containing gas.

With the features described above, the amount of water condensed in the hydro-desulfurizer can be reduced and the decrease in the activities of the hydrodesulfurization catalyst can be reduced in comparison with the related art, while deposition of carbon in the reformer is suppressed. Moreover, since the above-mentioned control is executed in the state where the recycle flow passage is closed, the steam remaining in the recycle flow passage is inhibited from flowing into the hydro-desulfurizer, and the amount of water condensed in the hydro-desulfurizer is further reduced.

According to a tenth aspect of the present disclosure, in the method for operating the hydrogen generating apparatus according to the ninth aspect, the hydro-desulfurizer may include therein a hydrodesulfurization catalyst, the hydrodesulfurization catalyst being a catalyst that adsorptively removes a sulfur compound in the raw material even when the hydrogen-containing gas is not supplied through the recycle flow passage.

With the features described above, even when the closing device is closed in the procedures for stopping the operation, the sulfur compound in the raw material supplied to the reformer can be removed.

According to an eleventh aspect of the present disclosure, in the method for operating the hydrogen generating apparatus according to the ninth aspect, in the step (a), the raw material may pass through an adsorbent desulfurizer before passing through the hydro-desulfurizer.

With the feature described above, even after the supply of hydrogen to the hydro-desulfurizer is stopped, the raw material having been desulfurized by the adsorbent desulfurizer can be supplied to the reformer, and poisoning of the reformation catalyst caused by the sulfur compound can be reduced.

According to a twelfth aspect of the present disclosure, in the method for operating the hydrogen generating apparatus according to any one of the ninth to eleventh aspects, the step (b) may be executed at least until inside of the hydro-desulfurizer is purged with the raw material.

With the feature described above, the decrease in the activities of the hydrodesulfurization catalyst can be more effectively reduced in the hydrogen generating apparatus including the hydro-desulfurizer.

According to a thirteenth aspect of the present disclosure, the method for operating the hydrogen generating apparatus according to any one of the ninth to twelfth aspects may further include a step (c) of purging inside of the reformer with the raw material when the temperature of the reformer drops down to the temperature or below at which deposition of carbon from the raw material on the reformation catalyst disposed inside the reformer is suppressed, after executing the steps (a) and (b).

With the feature described above, in the hydrogen generating apparatus including the hydro-desulfurizer, the decrease in the activities of the hydrodesulfurization catalyst can be reduced in comparison with the related art, while deposition of carbon on the reformation catalyst is suppressed. Moreover, since the above-mentioned control is executed in the state where the recycle flow passage is closed, the steam remaining in the recycle flow passage is inhibited from flowing into the hydro-desulfurizer, and the amount of water condensed in the hydro-desulfurizer is further reduced.

A fourteenth aspect of the present disclosure provides a method for operating a fuel cell system, the method including a step (d) of, when stopping operation of the fuel cell system, closing a recycle flow passage through which part of hydrogen-containing gas generated in the reformer through a reforming reaction is supplied to a hydro-desulfurizer, and supplying the raw material to the hydro-desulfurizer, before a temperature of the reformer drops down to a temperature at which deposition of carbon from the raw material on a reformation catalyst disposed inside the reformer is suppressed, and a step (e) of, during execution of the step (d), supplying the raw material having passed through the hydro-desulfurizer and reaction gas, which is used for the reforming reaction, other than the raw material to the reformer, and generating the hydrogen-containing gas.

With the features described above, the decrease in the activities of the hydrodesulfurization catalyst can be reduced in the fuel cell system including the hydro-desulfurizer.

According to a fifteenth aspect of the present disclosure, the method for operating the fuel cell system according to the fourteenth aspect may further include a step (f) of generating electric power in a fuel cell during execution of the step (e).

With the feature described above, decreases in the respective activities of the hydrodesulfurization catalyst, the reformation catalyst, and the electrode catalyst can be reduced in the fuel cell system including the hydro-desulfurizer.

According to a sixteenth aspect of the present disclosure, the method for operating the fuel cell system according to the fourteenth or fifteenth aspect, may further include a step (g) of purging insides of the reformer and the fuel cell with the raw material when the temperature of the reformer drops down to the temperature or below at which deposition of carbon from the raw material on the reformation catalyst disposed inside the reformer is suppressed, after executing the steps (d) and (e).

With the feature described above, the decreases in the respective activities of the reformation catalyst and the electrode catalyst can be reduced. Moreover, since the above-mentioned control is executed in the state where the recycle flow passage is closed, the steam remaining in the recycle flow passage is inhibited from flowing into the hydro-desulfurizer, and the amount of water condensed in the hydro-desulfurizer is further reduced.

Embodiments of the present disclosure will be described below with reference to the accompanying drawings.

It is to be noted that the following embodiments represent specific examples of the present disclosure. Numerical values, shapes, materials, components, arrangement positions and connection forms of the components, steps, sequences of steps, and so on, which are described in the following embodiments, are merely illustrative, and they are not purported to limit the present disclosure. Among the components in the following embodiments, those ones other than the components not stated in independent claims, which define most significant concepts, are described as optional components. Descriptions of the components denoted by the same reference symbols in the drawings are not repeated in some cases. The drawings are intended to depict the components in a schematic manner for easier understanding, and shapes, dimensional ratios, etc. are not exactly depicted in some cases. In manufacturing methods, the sequence of individual steps, etc. may be changed as required, and other known steps may be added optionally.

First Embodiment

[Apparatus Configuration]

FIG. 1 is a block diagram illustrating one example of a basic configuration of a hydrogen generating apparatus 100 according to a first embodiment. The hydrogen generating apparatus 100 according to the first embodiment will be described below with reference to FIG. 1.

In the example illustrated in FIG. 1, the hydrogen generating apparatus 100 includes a reformer 2, a raw material supplier 4, a reaction gas supplier 6, a hydro-desulfurizer 8, a recycle flow passage 10, a closing device 12, and a controller 14.

The reformer 2 generates hydrogen-containing gas through a reforming reaction by employing a raw material and reaction gas other than the raw material. The reforming reaction may be any type of reaction, including a steam reformation reaction, an autothermal reaction, and a partial oxidation reaction, for example. The raw material contains an organic compound in which at least carbon and hydrogen are constituent elements. Specific examples of the raw material are gases containing organic compounds made up of at least carbons and hydrogens, such as city gas, natural gas, LPG, and LNG in each of which methane is a main constituent, and are hydrocarbons and alcohols such as methanol. The reaction gas other than the raw material is, for example, steam when the reforming reaction is the steam reforming reaction, steam and air when the reforming reaction is the autothermal reaction, and air when the reforming reaction is the partial oxidation reaction.

The reformer 2 includes a reformation catalyst to promote the reforming reaction. A catalyst metal, such as Ru or Ni, is used as the reformation catalyst.

The hydrogen generating apparatus 100 may further include, as required, devices used to progress the reforming reaction. For example, when the reforming reaction is the steam reforming reaction, the hydrogen generating apparatus 100 may further include a combustor for heating the reformer, an evaporator for generating steam, and a water supplier for supplying water to the evaporator. When the reforming reaction is the autothermal reaction, the hydrogen generating apparatus 100 may further include an air supply device for supplying air to the reformer, or a temperature detector (not illustrated) for detecting the temperature of the reformation catalyst.

A CO reducer for reducing carbon monoxide in the hydrogen-containing gas generated by the reformer 2 may be disposed downstream of the reformer 2. The CO reducer includes at least one of a shift converter for reducing carbon monoxide through a shift reaction, and a CO remover for reducing carbon monoxide through at least one of an oxidation reaction and a methanation reaction.

The raw material supplier 4 supplies the raw material to the reformer 2. The raw material supplier 4 may be constituted such that a flow rate of the raw material supplied to the reformer 2 can be adjusted. The raw material supplier 4 is constituted by a booster and a flow control valve, for example. Alternatively, the raw material supplier 4 may be constituted by one of the booster and the flow control valve. The booster is, e.g., a fixed displacement pump driven by a motor, but it is not limited that type of pump. The raw material is supplied from a raw material supply source. The raw material supply source may have a predetermined supply pressure, and may be, e.g., a raw-material gas canister or an infrastructure to supply raw material gas.

The reaction gas supplier 6 supplies the reaction gas other than the raw material to the reformer 2. The reaction gas supplier 6 may be constituted such that a flow rate of the reaction gas, supplied to the reformer 2, other than the raw material can be adjusted. The reaction gas supplier 6 may be provided, for example, as a steam supplying device when the reforming reaction is, e.g., the steam reforming reaction, the oxidative steam reforming reaction, or the autothermal reaction, or as an air supply device when the reforming reaction is, e.g., the partial oxidation reforming reaction, the oxidative steam reforming reaction, or the autothermal reaction. Here, the steam supplying device includes an evaporator for generating steam, a water supplier for supplying water to the evaporator, and a heater for heating the evaporator. The heater may be constituted by the combustor for heating the reformer 2. An amount of steam supplied from the steam supplying device is adjusted by controlling at least one of the water supplier and the heater.

The hydro-desulfurizer 8 removes a sulfur compound in the raw material supplied to the reformer 2. The hydro-desulfurizer 8 converts the sulfur compound to hydrogen sulfide through a hydrogenation reaction, and removes the hydrogen sulfide through chemical adsorption. The hydro-desulfurizer 8 may be constituted by filling a hydrodesulfurization catalyst in a container. The hydrodesulfurization catalyst may be, for example, a CuZn-based catalyst that has both the function of converting the sulfur compound to hydrogen sulfide and the function of adsorbing the hydrogen sulfide. The hydrodesulfurization catalyst is not limited to the above-mentioned example, and it may be constituted by a CoMo-based catalyst that converts the sulfur compound in the raw material to hydrogen sulfide, and a ZnO-based catalyst or a CuZn-based catalyst, which is a sulfur adsorbent disposed downstream of the CoMo-based catalyst and which adsorptively removes the hydrogen sulfide.

The sulfur compound may be a sulfur compound that is artificially added as an odorant to the raw material, or a natural sulfur compound that is derived from the raw material itself. Specific examples of the sulfur compound includes TBM (tertiary-butylmercaptan), DMS (dimethyl sulfide), THT (Tetrahydrothiophene), COS (carbonyl sulfide), and hydrogen sulfide.

The hydrodesulfurization catalyst included inside the hydro-desulfurizer may be a catalyst that adsorptively removes the sulfur compound in the raw material, even when the hydrogen-containing gas is not supplied through the recycle flow passage. That type of hydrodesulfurization catalyst is, for example, a CuZn-based catalyst that has both the function of converting the sulfur compound to hydrogen sulfide and the function of adsorbing the hydrogen sulfide.

The recycle flow passage 10 is a flow passage through which part of the hydrogen-containing gas generated in the reformer 2 is supplied to the hydro-desulfurizer 8. An upstream end of the recycle flow passage 10 may be connected to any point of a flow passage through which the hydrogen-containing gas generated in the reformer 2 flows. For example, when the CO reducer for reducing carbon monoxide in the hydrogen-containing gas is disposed downstream of the reformer 2, the upstream end of the recycle flow passage 10 may be connected to a flow passage between the reformer 2 and the CO reducer, or to the CO reducer, or to the downstream side of the CO reducer. When the CO reducer includes a shift converter for reducing carbon monoxide through a shift reaction, and a CO remover for reducing carbon monoxide through at least one of an oxidation reaction and a methanation reaction, the upstream end of the recycle flow passage 10 may be connected to a flow passage between the shift converter and the CO remover. Alternatively, the upstream end of the recycle flow passage 10 may be connected to a flow passage downstream of a hydrogen utilizing device that utilizes the hydrogen-containing gas.

The closing device 12 closes the recycle flow passage. The closing device 12 may be constituted, for example, as a switch for opening and closing the recycle flow passage. More specifically, the closing device 12 may be constituted as a solenoid on-off valve. The closing device 12 may be connected to the controller 14 in a communication-enable manner between them such that the recycle flow passage is opened and closed under control of the controller 14.

When stopping the operation of the hydrogen generating apparatus 100, before the temperature of the reformer 2 drops down to a temperature at which deposition of carbon from the raw material on the reformation catalyst disposed inside the reformer 2 is suppressed, the controller 14 closes the closing device 12 and further controls the raw material supplier 4 and the reaction gas supplier 6 such that the raw material and the reaction gas other than the raw material are supplied to the reformer 2. The controller 14 may be any type of controller having the control function. The controller 14 includes a processor (not illustrated), and a storage unit (not illustrated) for storing control programs. The processor is, for example, an MPU or a CPU. The storage unit is, for example, a memory. The controller 14 may be constituted by a single controller executing concentrated control, or by a plurality of controllers executing distributed control through cooperation.

The above-mentioned control may be executed at any timing before the temperature of the reformer 2 drops down to the temperature at which deposition of carbon from the raw material on the reformation catalyst is suppressed, after start of operation stop processing of the hydrogen generating apparatus 100. For example, the above-mentioned control may be executed by continuously supplying the raw material and the reaction gas other than the raw material to the reformer 2 even after the start of the operation stop processing of the hydrogen generating apparatus 100, whereas the closing device 12 is closed. Alternatively, the above-mentioned control may be executed as follows. When the operation stop processing of the hydrogen generating apparatus 100 is started, the supply of the raw material and the reaction gas other than the raw material to the reformer 2 is stopped, and the closing device 12 is also closed. Thereafter, before the temperature of the reformer 2 drops down to the temperature at which deposition of carbon from the raw material on the reformation catalyst is suppressed, the supply of the raw material and the reaction gas other than the raw material to the reformer 2 is performed while the closing device 12 is kept closed.

The reaction gas, supplied to the reformer 2, other than the raw material may not be the same between before the start of the operation stop processing of the reformer 2 and when the above-mentioned control is executed. For example, before the start of the operation stop processing of the reformer 2, steam and air may be supplied, as the reaction gas other than the raw material, to perform the oxidative steam reforming reaction. In the above-mentioned control, steam may be supplied, as the reaction gas other than the raw material, to perform the steam reforming reaction. Alternatively, air may be supplied, as the reaction gas other than the raw material, to perform the partial oxidation reaction.

In general, the reforming reaction is able to progress at temperature at timing before the temperature of the reformer 2 drops down to the temperature at which deposition of carbon from the raw material on the reformation catalyst is suppressed. Therefore, it is not required to supply heat to the reformer 2 from the combustor in the above-mentioned control.

The operation stop processing of the hydrogen generating apparatus 100 is started upon issuance of a stop request. Here, the term "stop request" is issued, for example, upon reaching a preset stop-procedure start time of the hydrogen generating apparatus 100, or when a user operates a stopping device (e.g., a remote controller or a cellular phone) and instructs the start of the operation stop processing of the hydrogen generating apparatus 100. When procedures for stopping the operation of the hydrogen generating apparatus 100 are started, stop processing of the hydrogen generating apparatus 100 is executed.

By closing the closing device 12, the supply of the hydrogen-containing gas (recycle gas) to the hydro-desulfurizer 8 is stopped. On the other hand, the supply of the raw material and the reaction gas other than the raw material to the reformer 2 is continued, whereby the raw material is supplied to the inside of the hydro-desulfurizer 8. The raw material has a lower steam concentration than the hydrogen-containing gas. Accordingly, the dew point inside the hydro-desulfurizer 8 is lowered, and an amount of water condensed inside the hydro-desulfurizer 8 is reduced even with a drop of the temperature. As a result, a decrease in the activities of the hydrodesulfurization catalyst caused by the condensed water can be reduced. On the other hand, since the raw material and the reaction gas other than the raw material are supplied to the reformer 2, the reforming reaction is progressed. Hence, even with the temperature of the reformer 2 being at such a high level as carbonizing the raw material, carbonization of the raw material, i.e., deposition of carbon, is suppressed.

When the controller 14 executes the above-mentioned control in the operation stop processing of the hydrogen generating apparatus 100, the controller 14 may control the raw material supplier 4 and the reaction gas supplier 6 such that the raw material and the reaction gas other than the raw material are supplied to the reformer 2 until at least the inside of the hydro-desulfurizer 8 is purged with the raw material. Here, "until at least the inside of the hydro-desulfurizer 8 is purged with the raw material" may imply, for example, "until the raw material is supplied to the hydro-desulfurizer 8 in an amount corresponding to at least the volume of an inner flow passage of the hydro-desulfurizer 8". After the inside of the hydro-desulfurizer 8 has been purged with the raw material, the controller 14 may stop the raw material supplier 4 and the reaction gas supplier 6.

The above-mentioned control may be implemented, for example, by incorporating a timing device (not illustrated) in the controller 14, and continuing the raw material purge until the lapse of a predetermined time. Alternatively, the hydrogen generating apparatus 100 may include a flow rate detector (not illustrated), and the raw material purge may be continued until an accumulated flow rate reaches the volume of the hydro-desulfurizer 8. The flow rate detector may be constituted integrally with the raw material supplier 4.

When, in the operation stop processing, the temperature of the reformation catalyst disposed inside the reformer 2 reaches the temperature at which deposition of carbon from the raw material is suppressed, the controller 14 may control the raw material supplier 4 to purge the inside of the reformer 2 with the raw material.

At that time, for performing the raw material purge of the hydro-desulfurizer 8, the controller 14 may control the reaction gas supplier 6 to stop the supply of the reaction gas other than the raw material in the case where the supply of the reaction gas by the reaction gas supplier 6 is continued immediately before the temperature of the reformation catalyst disposed inside the reformer 2 reaches the temperature at which deposition of carbon from the raw material is suppressed. Alternatively, in the case where the supply of the raw material by the raw material supplier 4 and the supply of the reaction gas by the reaction gas supplier 6 are both stopped, the controller 14 may operate only the raw material supplier 4 to supply the raw material to the reformer 2.

A temperature detector may be disposed to detect the temperature of the reformation catalyst. The temperature detector may directly detect the temperature of the reformation catalyst, or may indirectly detect the temperature of the reformation catalyst by detecting, e.g., the temperature of another part of the hydrogen generating apparatus 100.

[Operation Method]

Figure 2:
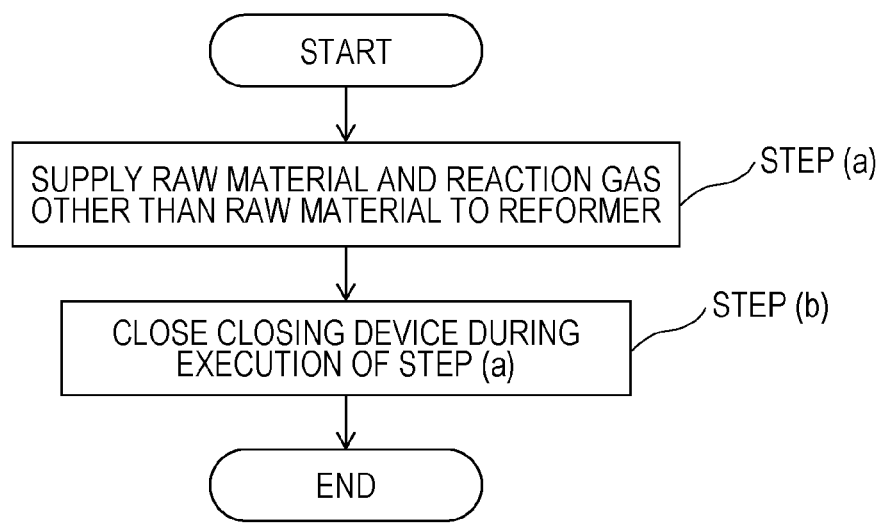
FIG. 2 is a flowchart illustrating one example of basic procedures of a method for operating the hydrogen generating apparatus according to the first embodiment.

FIG. 2 is a flowchart illustrating one example of basic procedures of a method for operating the hydrogen generating apparatus according to the first embodiment. The operation illustrated in the flowchart may be implemented, for example, by the controller 14 executing programs stored in the storage unit that is incorporated in the controller 14. However, it is not essential that the operation is executed by the controller 14. Part or the whole of the operation may be executed by an operator.

In the example illustrated in FIG. 2, when the operation of the hydrogen generating apparatus 100 is to be stopped, the control according to the present disclosure is started (START). Before the temperature of the reformer 2 drops down to the temperature at which deposition of carbon from the raw material on the reformation catalyst disposed inside the reformer 2 is suppressed, the controller 14 closes the recycle flow passage 10 through which part of the hydrogen-containing gas generated in the reformer 2 through the reforming reaction is supplied to the hydro-desulfurizer 8, while making control to supply the raw material to the hydro-desulfurizer 8 (step (a)). Specifically, in the illustrated example, even after the start of the operation stop processing of the hydrogen generating apparatus 100, the supply of the raw material to the hydro-desulfurizer 8 is continued.

During execution of the step (a), i.e., in the state of keeping the recycle flow passage 10 closed and supplying the raw material to the hydro-desulfurizer 8, the controller 14 makes control to supply the raw material having passed through the hydro-desulfurizer 8 and the reaction gas, which is used in the reforming reaction, other than the raw material to the reformer 2, thereby generating the hydrogen-containing gas (step (b)). Specifically, in the illustrated example, even after the start of the operation stop processing of the hydrogen generating apparatus 100, the supply of the reaction gas to the reformer 2 is continued. The type of the reaction gas may be changed insofar as the supplied reaction gas is able to progress the reforming reaction. For example, before the start of the operation stop processing of the hydrogen generating apparatus 100, steam may be supplied as the reaction gas other than the raw material to progress the steam reforming reaction, and in the above-mentioned control, air may be supplied as the reaction gas other than the raw material to progress the partial oxidation reaction.

Thereafter, the controller 14 ends the stop processing at predetermined timing (END).

By closing the recycle flow passage 10 before the temperature of the reformer 2 drops down to the temperature at which deposition of carbon from the raw material on the reformation catalyst disposed inside the reformer 2 is suppressed, the supply of the hydrogen-containing gas (recycle gas) to the hydro-desulfurizer 8 is stopped. However, the supply of the raw material to the hydro-desulfurizer 8 is continued, whereby the inside of the hydro-desulfurizer 8 is purged with the raw material. The raw material has a lower steam concentration than the hydrogen-containing gas. Accordingly, the dew point inside the hydro-desulfurizer 8 is lowered, and an amount of water condensed inside the hydro-desulfurizer 8 is reduced even with a drop of the temperature. It is hence possible to not only suppress the deposition of carbon in the reformer, but also to reduce the amount of water condensed inside the hydro-desulfurizer, thus suppressing a decrease in the activities of the hydrodesulfurization catalyst in comparison with the related art. Furthermore, since the above-mentioned control is executed in the state where the recycle flow passage is closed, steam remaining in the recycle flow passage is inhibited from flowing into the hydro-desulfurizer, and the amount of water condensed inside the hydro-desulfurizer is further reduced. On the other hand, since the raw material and the reaction gas other than the raw material are supplied to the reformer 2, the reforming reaction is progressed. Accordingly, even with the temperature of the reformer 2 being at such a high level as carbonizing the raw material, carbonization of the raw material, i.e., deposition of carbon, is suppressed.

The step (b) may be executed until at least the inside of the hydro-desulfurizer 8 is purged with the raw material. With such a feature, the decrease in the activities of the hydrodesulfurization catalyst can be more effectively reduced in the hydrogen generating apparatus including the hydro-desulfurizer.

An operating method according to a modification of the first embodiment may include a step (c) of purging the inside of the reformer when the temperature of the reformer 2 drops down to the temperature or below at which deposition of carbon from the raw material on the reformation catalyst disposed inside the reformer 2 is suppressed, after the execution of the steps (a) and (b). With such a feature, the decreases in the respective activities of the hydrodesulfurization catalyst and the reformation catalyst can be reduced in the hydrogen generating apparatus including the hydro-desulfurizer. Furthermore, since the above-mentioned control is executed in the state where the recycle flow passage is closed, steam remaining in the recycle flow passage is inhibited from flowing into the hydro-desulfurizer, and the amount of water condensed inside the hydro-desulfurizer is further reduced.

In the above-described control flow, the temperature of the reformer may be the temperature of the reformer itself or a temperature correlated to the temperature of the reformer. The temperature of the reformer itself is, for example, the temperature of a structure constituting the reformer, the temperature of the reformation catalyst, or the temperature of gas flowing through the reformer. The temperature correlated to the temperature of the reformer is, for example, the temperature of the hydrogen-containing gas discharged from the reformer, or the temperature of the combustor for heating the reformer.

Second Embodiment

[Apparatus Configuration]

Figure 3:
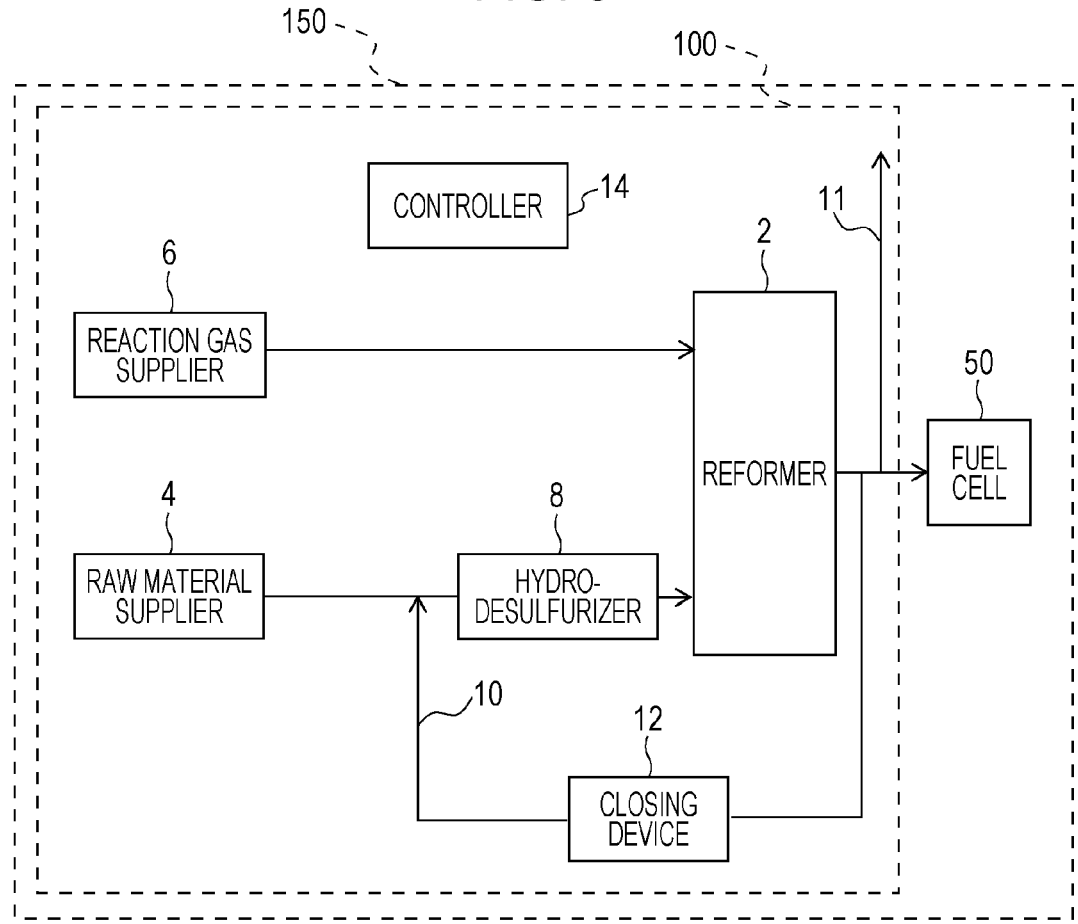
FIG. 3 is a block diagram illustrating one example of a basic configuration of a fuel cell system according to a second embodiment.

FIG. 3 is a block diagram illustrating one example of a basic configuration of a fuel cell system 150 according to a second embodiment. The fuel cell system 150 according to the second embodiment will be described below with reference to FIG. 3.

In the example illustrated in FIG. 3, the fuel cell system 150 includes a fuel cell 50. The fuel cell 50 generates electric power by employing the hydrogen-containing gas that is supplied from the hydrogen generating apparatus 100. The fuel cell 50 may be any type of fuel cell, including a polymer electrolyte fuel cell, a solid oxide fuel cell, and a phosphoric acid fuel cell, for example. When the fuel cell is the solid oxide fuel cell, the reformer 2 and the fuel cell 50 may be incorporated in one container.

Devices used in association with the fuel cell 50 may be disposed as required. For example, a fuel-cell temperature detector (not illustrated) may be disposed which detects the temperature of the fuel cell for use in control of a power generation reaction, for example.

Except for the above-mentioned point, the fuel cell system 150 may have a configuration similar to that of the hydrogen generating apparatus 100 according to the first embodiment. Therefore, components in common to FIGS. 1 and 3 are denoted by the same reference symbols and names, and detailed descriptions of those components are omitted.

The fuel cell system 150 may include a power conditioner (not illustrated). The power conditioner conditions electric power generated by the fuel cell 50. In the state where, when stopping the operation of the fuel cell system 150, before the temperature of the reformer 2 drops down to the temperature at which deposition of carbon from the raw material on the reformation catalyst disposed inside the reformer 2 is suppressed, the controller 14 closes the closing device 12 and controls the raw material supplier 4 and the reaction gas supplier 6 such that the raw material and the reaction gas other than the raw material are supplied to the reformer 2, the controller 14 further controls the power conditioner such that the fuel cell 50 generates electric power. The power conditioner may be constituted, for example, as a combination of an AC-DC converter that converts a DC output from the fuel cell 50 to an AC output, i.e., a load demanded from the outside, and a DC-DC converter that conditions the DC output to operate an auxiliary device for the fuel cell.

In the fuel cell system 150, when the inside of the reformer 2 is purged with the raw material, the raw material having passed through the reformer 2 may be caused to pass through a first bypass passage 11 bypassing the fuel cell 50. The first bypass passage 11 may be connected, for example, to a burner (not illustrated) that heats the reformer 2. It is to be noted that the first bypass passage 11 is not essential, and that the first bypass passage 11 may be omitted when the inside of the fuel cell 50 is also purged with the raw material as described below.

In the fuel cell system 150, when the inside of the reformer 2 is purged with the raw material, the raw material having passed through the reformer 2 may be supplied to the fuel cell 50 such that the inside of the fuel cell 50 is also purged with the raw material. Stated in another way, after executing the above-mentioned control, when the temperature of the reformation catalyst disposed inside the reformer 2 drops down to the temperature at which deposition of carbon from the raw material is suppressed, the controller 14 may control the raw material supplier 4 so as to purge the inside of the reformer 2 with the raw material, and to purge the inside of the fuel cell 50 with the raw material at the same time.

The fuel cell system 150 according to the second embodiment can also be modified as in the first embodiment.

[Operation Method]

Figure 4:
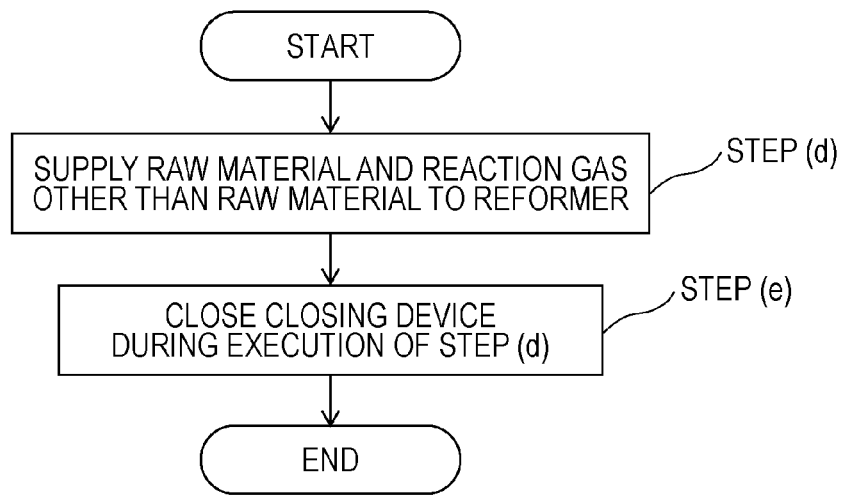
FIG. 4 is a flowchart illustrating one example of basic procedures of a method for operating the fuel cell system according to the second embodiment.

FIG. 4 is a flowchart illustrating one example of basic procedures of a method for operating the fuel cell system according to the second embodiment. The operation illustrated in the flowchart may be implemented, for example, by the controller 14 executing programs stored in the storage unit that is incorporated in the controller 14. However, it is not essential that the operation is executed by the controller 14. Part or the whole of the operation may be executed by an operator.

In the example illustrated in FIG. 4, when the operation of the fuel cell system 150 is to be stopped, the control according to the present disclosure is started (START). Before the temperature of the reformer 2 drops down to the temperature at which deposition of carbon from the raw material on the reformation catalyst disposed inside the reformer 2 is suppressed, the controller 14 closes the recycle flow passage 10 through which part of the hydrogen-containing gas generated in the reformer 2 through the reforming reaction is supplied to the hydro-desulfurizer 8, while making control to supply the raw material to the hydro-desulfurizer 8 (step (d)). Specifically, in the illustrated example, even after the start of the operation stop processing of the fuel cell system 150, the supply of the raw material to the hydro-desulfurizer 8 is continued.

During execution of the step (d), i.e., in the state of keeping the recycle flow passage 10 closed and supplying the raw material to the hydro-desulfurizer 8, the controller 14 makes control to supply the raw material having passed through the hydro-desulfurizer 8 and the reaction gas, which is used in the reforming reaction, other than the raw material to the reformer 2, thereby generating the hydrogen-containing gas (step (e)). Specifically, in the illustrated example, even after the start of the operation stop processing of the hydrogen generating apparatus 100, the supply of the reaction gas to the reformer 2 is continued. The type of the reaction gas may be changed insofar as the supplied reaction gas is able to progress the reforming reaction. For example, before the start of the operation stop processing of the hydrogen generating apparatus 100, steam may be supplied as the reaction gas other than the raw material to progress the steam reforming reaction, and in the above-mentioned control, air may be supplied as the reaction gas other than the raw material to progress the partial oxidation reaction.

Thereafter, the controller 14 ends the stop processing at predetermined timing (END).

By closing the recycle flow passage 10, the supply of the hydrogen-containing gas (recycle gas) to the hydro-desulfurizer 8 is stopped. However, the supply of the raw material to the hydro-desulfurizer 8 is continued, whereby the inside of the hydro-desulfurizer 8 is purged with the raw material. The raw material has a lower steam concentration than the hydrogen-containing gas. Accordingly, the dew point inside the hydro-desulfurizer 8 is lowered, and an amount of water condensed inside the hydro-desulfurizer 8 is reduced even with a drop of the temperature. As a result, a decrease in the activities of the hydrodesulfurization catalyst caused by the condensed water can be reduced. On the other hand, since the raw material and the reaction gas other than the raw material are supplied to the reformer 2, the reforming reaction is progressed. Accordingly, even with the temperatures in the reformer 2 and the fuel cell 50 being at such a high level as carbonizing the raw material, carbonization of the raw material, i.e., deposition of carbon, is suppressed.

During the execution of the step (e), the fuel cell 50 may generate electric power (step (f)).

The insides of both the reformer 2 and the fuel cell 50 may be purged with the raw material (step (g)) when the temperature of the reformer 2 drops down to the temperature or below at which deposition of carbon from the raw material on the reformation catalyst disposed inside the reformer 2 is suppressed, after the execution of the steps (d) and (e). With such a feature, the decrease in the respective activities of the hydrodesulfurization catalyst, the reformation catalyst, and the electrode catalyst can be reduced in the fuel cell system including the hydro-desulfurizer. Furthermore, since the above-mentioned control is executed in the state where the recycle flow passage is closed, steam remaining in the recycle flow passage is inhibited from flowing into the hydro-desulfurizer, and the amount of water condensed inside the hydro-desulfurizer is further reduced.

In the above-described control flow, the temperature of the reformer may be the temperature of the reformer itself or a temperature correlated to the temperature of the reformer. The temperature of the reformer itself is, for example, the temperature of a structure constituting the reformer, the temperature of the reformation catalyst, or the temperature of gas flowing through the reformer. The temperature correlated to the temperature of the reformer is, for example, the temperature of the hydrogen-containing gas discharged from the reformer, or the temperature of the combustor for heating the reformer.

The method of operating the fuel cell system according to the second embodiment can also be modified as in the first embodiment.

Third Embodiment

[Apparatus Configuration]

Figure 5:
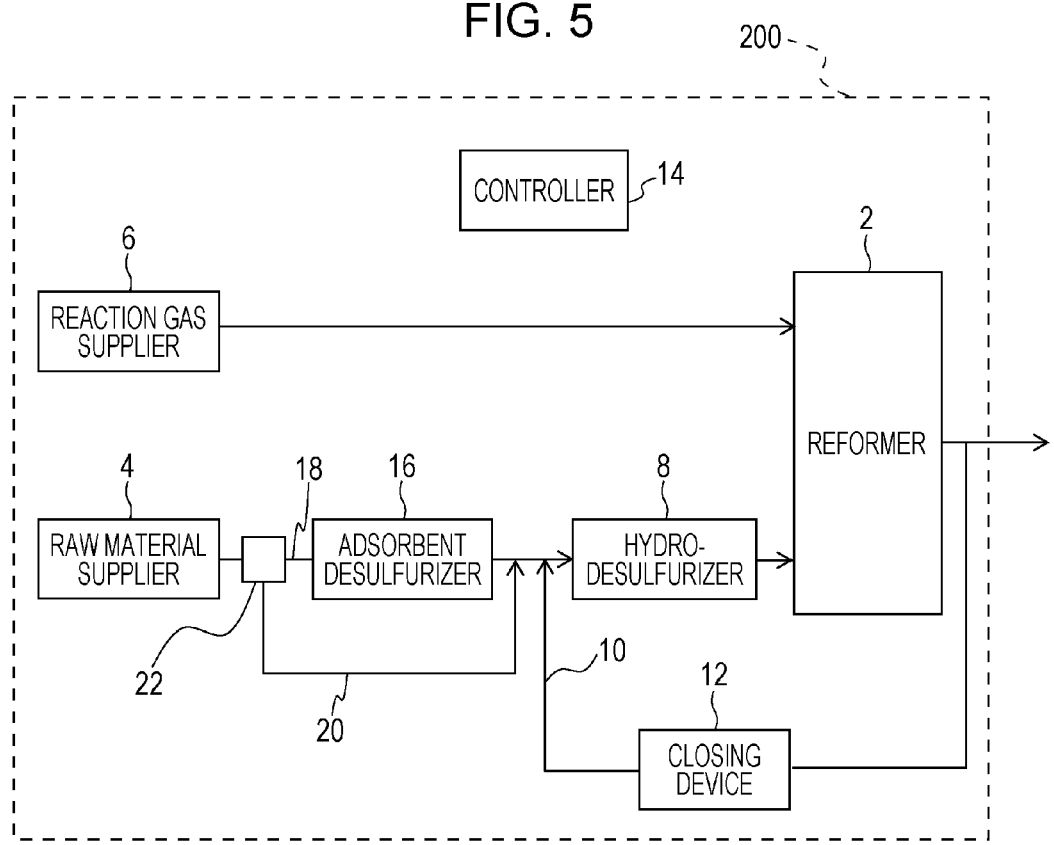
FIG. 5 is a block diagram illustrating one example of a basic configuration of a hydrogen generating apparatus according to a third embodiment.

FIG. 5 is a block diagram illustrating one example of a basic configuration of a hydrogen generating apparatus 200 according to a third embodiment. The hydrogen generating apparatus 200 according to the third embodiment will be described below with reference to FIG. 5.

In the example illustrated in FIG. 5, the hydrogen generating apparatus 200 includes an adsorbent desulfurizer 16, a first material supplying passage 18, a second material supplying passage 20, and a switching device 22.

The adsorbent desulfurizer 16 adsorptively removes the sulfur compound in the raw material upstream of the hydro-desulfurizer 8. The adsorbent desulfurizer 16 adsorptively removes the sulfur compound in the raw material in a physical manner. The adsorbent desulfurizer 16 may be a desulfurizer that adsorptively removes the sulfur compound in the raw material at ordinary temperature. The term "ordinary temperature" is used here to represent temperature relatively close to an ordinary temperature range than the temperature (e.g., about 300° C.) at which the hydro-desulfurizer 8 is used, and it implies temperatures ranging from the ordinary temperature to a temperature at which an employed desulfurizing agent effectively functions as the desulfurizing agent.

The first material supplying passage 18 provides a passage through which the raw material supplied to the reformer 2 via the adsorbent desulfurizer 16 and the hydro-desulfurizer 8 flows. The second material supplying passage 20 provides a passage through which the raw material supplied to the reformer 2 via the hydro-desulfurizer 8, but not via the adsorbent desulfurizer 16, flows. The adsorbent desulfurizer 16 is disposed in the first material supplying passage 18, but it is not disposed in the second material supplying passage 20. The first material supplying passage 18 and the second material supplying passage 20 may be partly constituted by a common flow passage.

The switching device 22 switches over the first material supplying passage 18 and the second material supplying passage 20. The switching device 22 may be constituted, for example, as a three-way valve, or an on-off valve that is disposed in each of the first material supplying passage 18 and the second material supplying passage 20.

When stopping the operation, before the temperature of the reformer 2 drops down to the temperature at which deposition of carbon from the raw material on the reformation catalyst disposed inside the reformer 2 is suppressed, the controller 14 switches over the switching device 22 such that the raw material flows through the first material supplying passage 18, closes the closing device 12, and further controls the raw material supplier 4 and the reaction gas supplier 6 such that the raw material and the reaction gas other than the raw material are supplied to the reformer 2.

With the above-described control, in the case of purging the inside of the hydro-desulfurizer 8 with the raw material when the operation is to be stopped, even if the recycle gas is not supplied to the hydro-desulfurizer 8 and desulfurization in the hydro-desulfurizer 8 does not progress, the sulfur compound in the raw material is adsorptively removed by the adsorbent desulfurizer 16. Accordingly, a possibility of poisoning of the reformation catalyst, disposed inside the reformer 2, by the sulfur compound is reduced.

During the operation, the controller 14 may open the closing device 12, control the switching device 22 such that the raw material flows through the second material supplying passage 20, and further control the raw material supplier 4 and the reaction gas supplier 6 such that the raw material and the reaction gas other than the raw material are supplied to the reformer 2. With such control, during the operation, the raw material desulfurized by the hydro-desulfurizer 8 can be supplied to the reformer 2, whereas the desulfurization by the adsorbent desulfurizer 16 can be stopped to prolong the service lifetime of the adsorbent desulfurizer 16.

Except for the above-mentioned point, the hydrogen generating apparatus 200 may have a configuration similar to that of the hydrogen generating apparatus 100 according to the first embodiment. Therefore, components in common to FIGS. 1 and 5 are denoted by the same reference symbols and names, and detailed descriptions of those components are omitted.

The hydrogen generating apparatus 200 according to the third embodiment can also be modified as in the first embodiment.

[Operation Method]

A method for operating the hydrogen generating apparatus 200 according to the third embodiment may be the same as the method described above in the first embodiment with reference to FIG. 2 except for that, in the step (a), the raw material passes through the adsorbent desulfurizer 16 before passing through the hydro-desulfurizer 8. Hence detailed description of the operating method is omitted.

The method for operating the hydrogen generating apparatus according to the third embodiment can also be modified as in the first embodiment.

First Example

Figure 6:
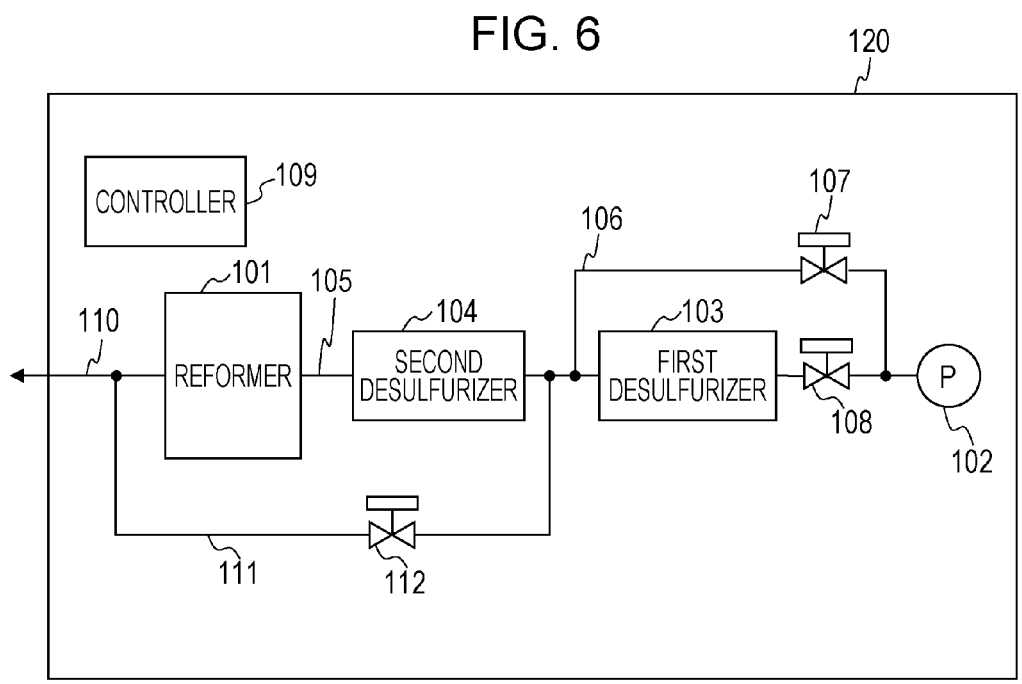
FIG. 6 is a block diagram illustrating one example of a basic configuration of a hydrogen generating apparatus according to First Example.
Figure 7:
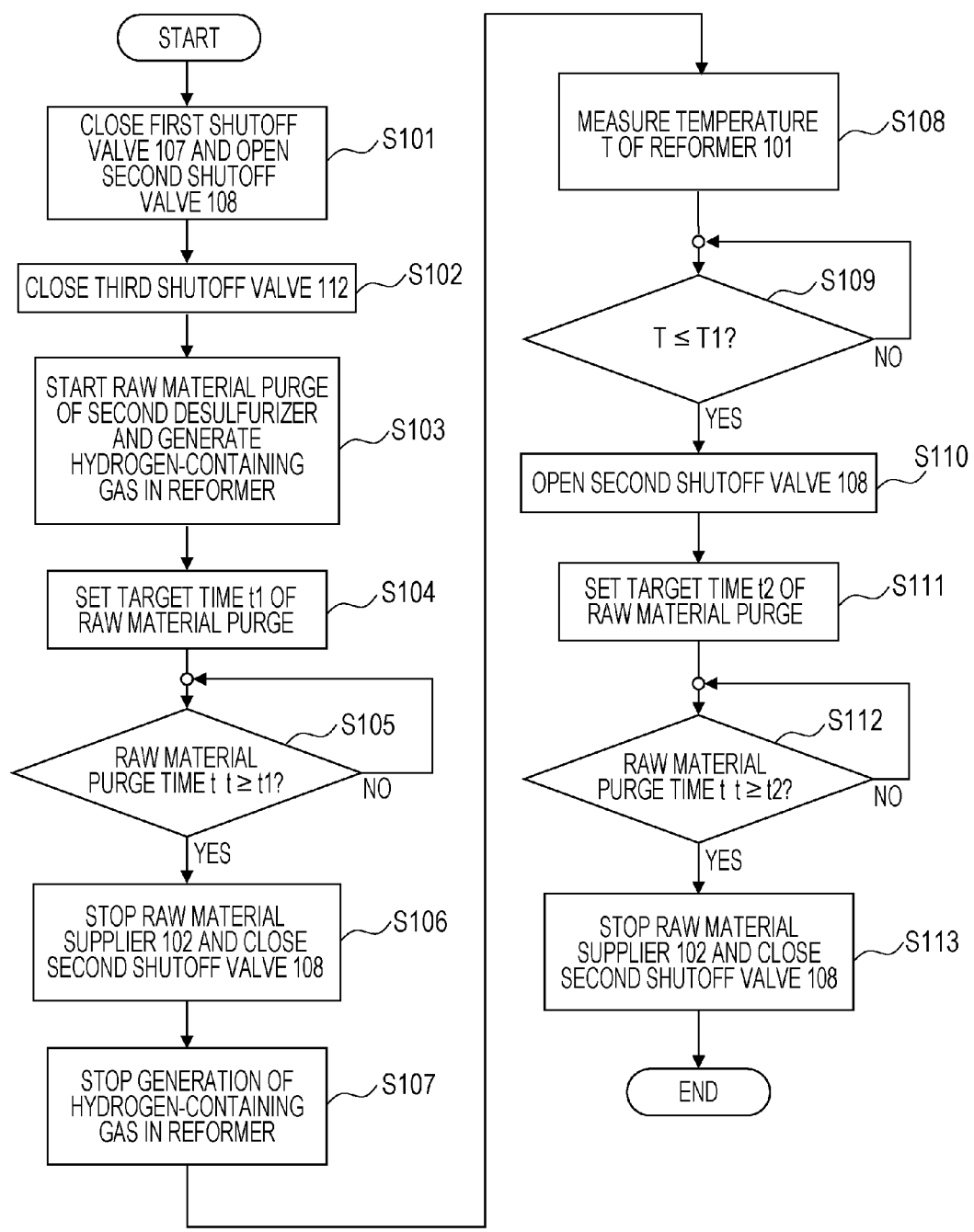
FIG. 7 is a flowchart illustrating one example of basic procedures of a method for operating the hydrogen generating apparatus according to First Example.

FIG. 6 is a block diagram illustrating one example of a basic configuration of a hydrogen generating apparatus 120 according to First Example. FIG. 7 is a flowchart illustrating one example of basic procedures of a method for operating the hydrogen generating apparatus according to First Example. The hydrogen generating apparatus according to First Example and the method for operating the same will be described below with reference to FIGS. 6 and 7.

As illustrated in FIG. 6, the hydrogen generating apparatus 120 according to First Example includes a reformer 101, a raw material supplier 102, a first desulfurizer 103, a second desulfurizer 104, a material supplying passage 105, a second bypass passage 106, a first shutoff valve 107, a second shutoff valve 108, a fuel passage 110, a recycle flow passage 111, a third shutoff valve 112, and a controller 109.

The reformer 101 generates, from a raw material, fuel containing hydrogen through a reforming reaction. Specifically, the reformer 101 generates hydrogen-containing gas as fuel by employing a raw material. In other words, fuel in the form of hydrogen-containing gas is generated in the reformer 101 through the reforming reaction of a raw material. The reformer 101 may have a configuration similar to that of the reformer 2 in the first embodiment. Hence detailed description of the reformer 101 is omitted.

The raw material supplier 102 supplies the raw material to the reformer 101. In First Example, the raw material supplier 102 is a device for adjusting a flow rate of the raw material supplied to the reformer 101. The raw material supplier 102 may have a configuration similar to that of the raw material supplier 4 in the first embodiment. Hence detailed description of the raw material supplier 102 is omitted.

The first desulfurizer 103 adsorptively removes a sulfur component contained in the raw material. The first desulfurizer 103 is an adsorbent desulfurizer and removes a sulfur compound in the raw material at ordinary temperature. The first desulfurizer 103 may have a configuration similar to that of the adsorbent desulfurizer 16 in the third embodiment. Hence detailed description of the first desulfurizer 103 is omitted.

The second desulfurizer 104 removes a sulfur component contained in the raw material through hydrodesulfurization. The second desulfurizer 104 is a hydro-desulfurizer and removes a sulfur compound in the raw material supplied to the reformer 101. The second desulfurizer 104 is constituted by filling a hydrodesulfurization catalyst in a container. The second desulfurizer 104 may have a configuration similar to that of the hydro-desulfurizer 8 in the first embodiment. Hence detailed description of the second desulfurizer 104 is omitted.

The material supplying passage 105 connects the first desulfurizer 103, the second desulfurizer 104, and the reformer 101 in the mentioned order for supply of the raw material therethrough. In other words, the material supplying passage 105 provides a flow passage through which the raw material supplied to the reformer 101, the first desulfurizer 103, and the second desulfurizer 104 flows.

The second bypass passage 106 is a passage bypassing the first desulfurizer 103. In other words, the second bypass passage 106 provides a flow passage through which the raw material flows without passing through the first desulfurizer 103.

The recycle flow passage 111 is connected to a fuel passage 110 through which fuel (hydrogen-containing gas) is delivered from the reformer 101. After being branched from the fuel passage 110, the recycle flow passage 111 is connected to the material supplying passage 105 upstream of the second desulfurizer 104 for supplying part of the hydrogen-containing gas. In other words, the recycle flow passage 111 provides a flow passage through which the fuel delivered from the reformer 101 as the hydrogen-containing gas is supplied to the raw material inside the material supplying passage 105 on the upstream side of the second desulfurizer 104 that is the hydro-desulfurizer. The recycle flow passage 111 may have a configuration similar to that of the recycle flow passage 10 in the first embodiment. Hence detailed description of the recycle flow passage 10 is omitted.

The first shutoff valve 107 is disposed in the second bypass passage 106.

The second shutoff valve 108 is disposed in the material supplying passage 105 upstream of the first desulfurizer 103, which is bypassed by the second bypass passage 106, and downstream of a branched point of the second bypass passage 106.

The third shutoff valve 112 is disposed in the recycle flow passage 111.

The fuel passage 110 provides a flow passage through which the fuel generated by the reformer 101 and supplied to a device (e.g., a fuel cell) flows, the device being connected to the downstream side of the hydrogen generating apparatus 120.

The first shutoff valve 107, the second shutoff valve 108, and the third shutoff valve 112 are devices capable of allowing and shutting off the flow of a fluid through the second bypass passage 106, the material supplying passage 105, and the recycle flow passage 111, respectively. For example, a solenoid valve is used as each of the above-mentioned shutoff valves.

While the first shutoff valve 107 and the second shutoff valve 108 are separately disposed in First Example, the present disclosure is not limited to that example. A device capable of selectively supplying the raw material to one of branched passages, e.g., a solenoid three-way valve, may be disposed at the branched point at which the second bypass passage 106 is branched from the material supplying passage 105.

The controller 109 controls the raw material supplier 102, the first shutoff valve 107, the second shutoff valve 108, and the third shutoff valve 112 in accordance with information including the temperature of the reformer 101, the temperature of the second desulfurizer 104, and so on. The controller 109 may have a configuration similar to that of the controller 14 in the first embodiment. Hence detailed description of the controller 109 is omitted.

The operation of the hydrogen generating apparatus 120 will be described below with reference to FIG. 7.

When the hydrogen generating apparatus 120 is in a state of generating the hydrogen-containing gas before stopping the operation, the controller 109 opens the first shutoff valve 107, closes the second shutoff valve 108, and opens the third shutoff valve 112. The raw material is supplied from the raw material supplier 102 to the second desulfurizer 104 through the second bypass passage 106 bypassing the first desulfurizer 103. After the sulfur compound in the raw material has been removed by the second desulfurizer 104, the raw material is supplied to the reformer 101 where fuel, i.e., the hydrogen-containing gas, is generated. To further perform hydrodesulfurization in the second desulfurizer 104, part of the generated hydrogen-containing gas is supplied to the second desulfurizer 104 through the recycle flow passage 111.

Referring to FIG. 7, when the operation of the hydrogen generating apparatus 120 is to be stopped, control of the hydrogen generating apparatus 120 according to First Example is started (START). The controller 109 executes a step (A) of closing the first shutoff valve 107 and opening the second shutoff valve 108 (step S101).

Then, the controller 109 executes a step (B) of closing the third shutoff valve 112 (step S102). As a result, supply of the hydrogen-containing gas, including steam, to the second desulfurizer 104 through the recycle flow passage 111 is stopped. Thus, in the second desulfurizer 104, the desulfurization function is not developed because the hydrogen-containing gas is not supplied to the second desulfurizer 104. However, because the raw material is supplied through the first desulfurizer 103 with the control of the step S101, the desulfurization function is maintained in the entirety of the hydrogen generating apparatus.

Since the controller 109 stops the supply of the hydrogen-containing gas to the second desulfurizer 104 in the step S102 while continuing the supply of the raw material through the first desulfurizer 103, a step (C) of purging the inside of the second desulfurizer 104 with the raw material is started. At that time, the reformer 101 continues the generation of the hydrogen-containing gas (step S103). In other words, supply of the reaction gas other than the raw material from a reaction gas supplier (not illustrated) to the reformer 101 is continued, whereby the reforming reaction in the reformer 101 is continued.

Then, a target time t1 of the raw material purge for the second desulfurizer 104 is set (step S104). Here, based on an inner volume of the second desulfurizer 104 and a flow rate of the raw material needed to perform the generation of the hydrogen-containing gas in the reformer 101, a time that is least required for inner gas of the second desulfurizer 104 to be replaced with the raw material, e.g., a time during which a total flow rate of the raw material becomes equal to the inner volume of the second desulfurizer 104, is set as the target time t1. While a duration time of the raw material purge is set using a timer in First Example, the present disclosure is not limited that example. A flow meter may be disposed, and a time least taken until an accumulated value of the flow rate becomes equal to the inner volume of the second desulfurizer 104 may be set as the target time t1.

Then, a raw material purge time t is measured, and it is determined whether the target time t1 has lapsed (step S105). If the raw material purge time t is shorter than t1, the step S105 is continued. If the raw material purge time t is equal to or longer than t1 in the step S105, the controller 109 executes a step (D) of stopping the raw material supplier 102 to stop the supply of the raw material, and closing the second shutoff valve 108, thereby stopping the generation of the hydrogen-containing gas in the reformer 101 (steps S106 and S107).

Then, measurement of a temperature T of the reformer 101 is started (step S108).

Then, it is determined if the temperature T of the reformer 101 reaches a temperature T1 (e.g., 150° C.) or below at which deposition of carbon from the raw material on the reformation catalyst is suppressed (step S109). If the temperature T of the reformer 101 is not lower than T1, the step S109 is continued.

If it is determined that the temperature T of the reformer 101 is equal to or lower than T1, the second shutoff valve 108 is opened (step S110).

Then, a target time t2 of the raw material purge for the reformer 101 is set (step S111). Here, a time that is least required for inner gas of the reformer 101 to be replaced with the raw material, e.g., a time during which a total flow rate of the raw material becomes equal to an inner volume of the reformer 101, is set as the target time t2. While a duration time of the raw material purge is set using a timer in First Example, the present disclosure is not limited that example. A flow meter may be disposed, and a time least taken until an accumulated value of the flow rate becomes equal to the inner volume of the reformer 101 may be set as the target time t2.

Then, a raw material purge time t is measured, and it is determined whether the target time t2 has lapsed (step S112). If the raw material purge time t is shorter than t2, the step S112 is continued. If the raw material purge time t is equal to or longer than t2 in the step S112, the raw material supplier 102 is stopped to stop the supply of the raw material, and the second shutoff valve 108 is closed (step S113).

Then, the control of the hydrogen generating apparatus 120 according to First Example is ended (END).

With the configuration of First Example, when stopping the operation of the hydrogen generating apparatus, steam remaining in the hydro-desulfurizer can be removed by the raw material purge regardless of the state of the device arranged downstream of the hydrogen generating apparatus unlike the case in which whether to perform the raw material purge or not is determined depending on the state of the device arranged downstream of the hydrogen generating apparatus. Accordingly, the operation can be stopped while the activities of the hydrodesulfurization catalyst are maintained.

With the configuration of continuing, in the step (C), the generation of the fuel in the reformer at least until the inside of the second desulfurizer is purged with the raw material having passed through the first desulfurizer, the steam remaining in the hydro-desulfurizer, i.e., the second desulfurizer, can be removed more effectively.

With the configuration of executing the step (A) to purge the insides of both the second desulfurizer and the reformer with the raw material when the temperature of the reformer drops down to the temperature or lower at which deposition of carbon from the raw material on the reformation catalyst disposed inside the reformer is suppressed, steam remaining in the reformer can also be removed without causing a decrease in the activities of the reformation catalyst. Moreover, since the above-described control is executed in the state where the recycle flow passage is closed, steam remaining in the recycle flow passage is inhibited from flowing into the hydro-desulfurizer, and the amount of water condensed in the hydro-desulfurizer is further reduced.

Fourth Embodiment

A fuel cell system according to a fourth embodiment includes the hydrogen generating apparatus according to the third embodiment or the modification thereof, and a fuel cell that generates electric power by employing the hydrogen-containing gas supplied from the hydrogen generating apparatus.

Figure 8:
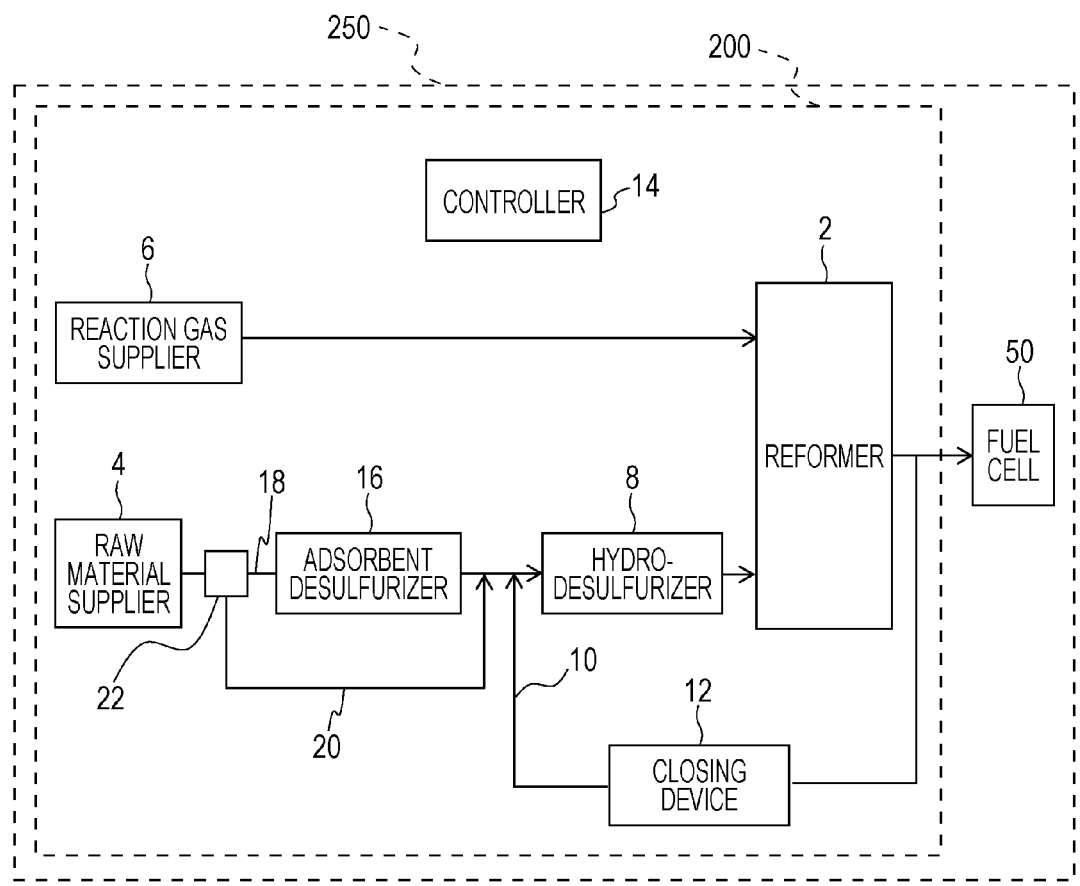
FIG. 8 is a block diagram illustrating one example of a basic configuration of a fuel cell system according to a fourth embodiment.

FIG. 8 is a block diagram illustrating one example of a basic configuration of a fuel cell system 250 according to the fourth embodiment. The fuel cell system 250 according to the fourth embodiment will be described below with reference to FIG. 8.

In the example illustrated in FIG. 8, the fuel cell system 250 includes a fuel cell 50. The fuel cell 50 may have a configuration similar to that of the fuel cell 50 in the second embodiment. Hence detailed description of the fuel cell is omitted.

Except for the above-mentioned point, the fuel cell system 250 may have a configuration similar to that of the hydrogen generating apparatus 200 according to the third embodiment. Therefore, components in common to FIGS. 5 and 8 are denoted by the same reference symbols and names, and detailed descriptions of those components are omitted.

The fuel cell system 250 according to the fourth embodiment can also be modified as in the first embodiment, the second embodiment, and the third embodiment.

Second Example

Figure 9:
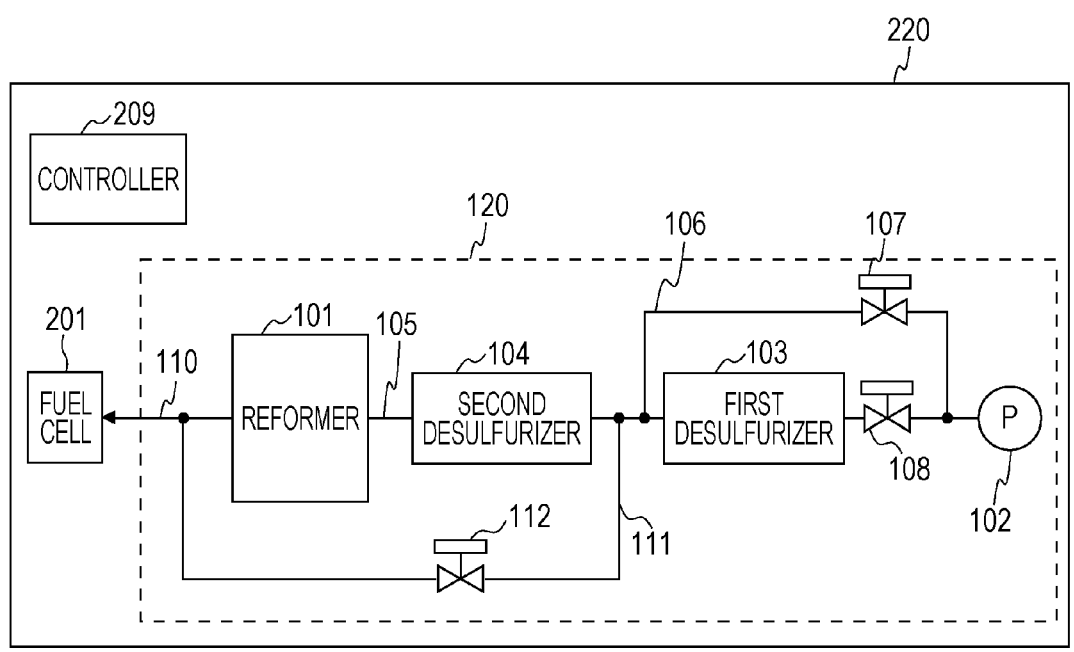
FIG. 9 is a block diagram illustrating one example of a basic configuration of a fuel cell system according to Second Example.
Figure 10:
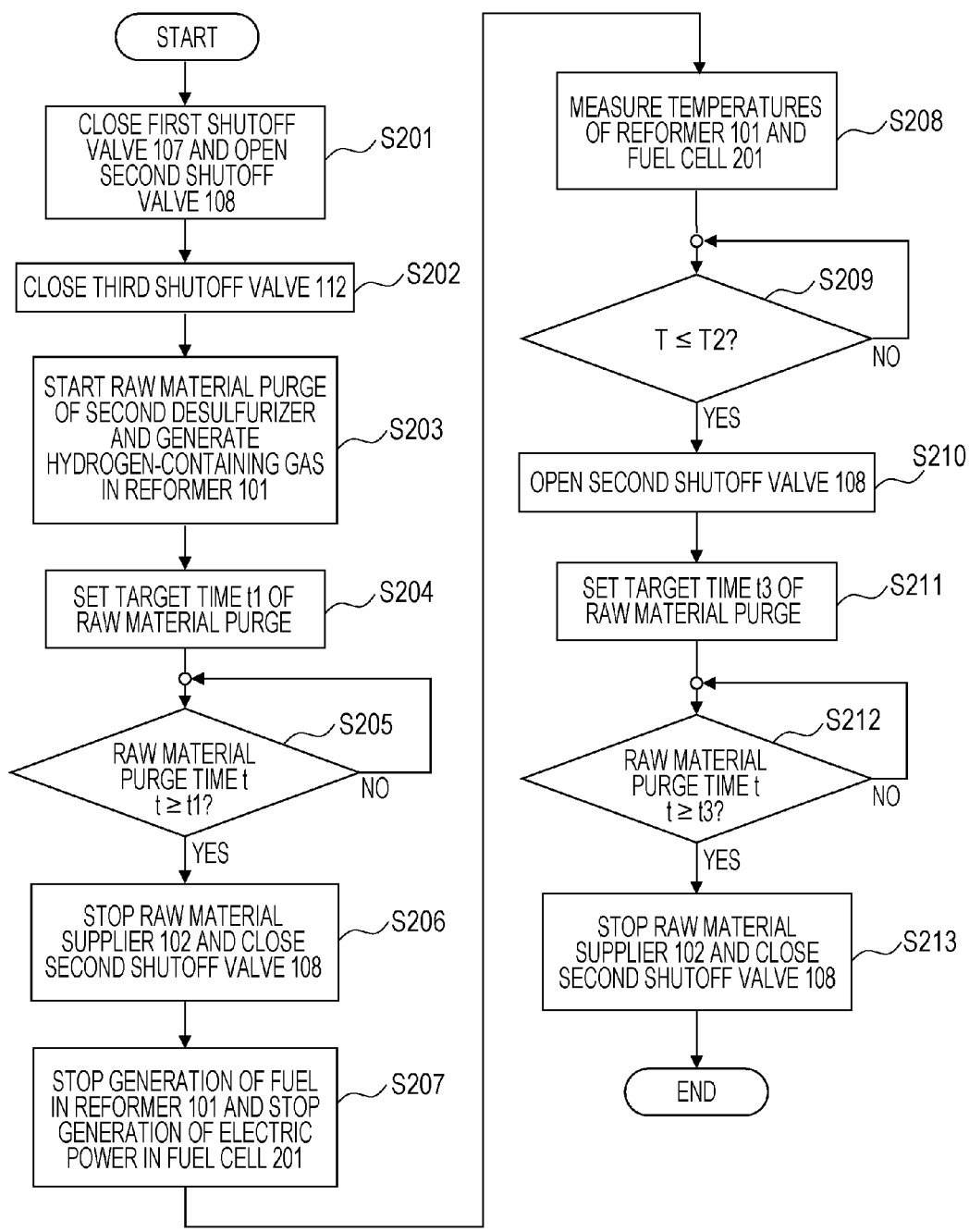
FIG. 10 is a flowchart illustrating one example of basic procedures of a method for operating the fuel cell system according to Second Example.

FIG. 9 is a block diagram illustrating one example of a basic configuration of a fuel cell system 220 according to Second Example. FIG. 10 is a flowchart illustrating one example of basic procedures of a method for operating the fuel cell system according to Second Example.

The fuel cell system according to Second Example and the method for operating the same will be described below with reference to FIGS. 9 and 10.

As illustrated in FIG. 9, the fuel cell system 220 according to Second Example includes a hydrogen generating apparatus 120, a fuel cell 201, and a controller 209 for the fuel cell system 220.

The hydrogen generating apparatus 120 and the controller 209 may have configurations similar to those of the hydrogen generating apparatus 120 and the controller 109 in First Example. Hence detailed descriptions of the hydrogen generating apparatus 120 and the controller 209 are omitted.

The fuel cell 201 generates electric power by employing fuel, i.e., the hydrogen-containing gas generated in the hydrogen generating apparatus 120. The fuel cell 201 may have a configuration similar to that of the fuel cell 50 in the second embodiment. Hence detailed description of the fuel cell 201 is omitted.

The operation of the fuel cell system 220 will be described below with reference to FIG. 10.

When the fuel cell system 220 is in a state of generating electric power before stopping the operation, the controller 209 opens the first shutoff valve 107, closes the second shutoff valve 108, and opens the third shutoff valve 112. The raw material is supplied from the raw material supplier 102 to the second desulfurizer 104 through the second bypass passage 106 bypassing the first desulfurizer 103. After the sulfur compound in the raw material has been removed by the second desulfurizer 104, the raw material is supplied to the reformer 101 where fuel (hydrogen-containing gas) is generated. The generated fuel is supplied to the fuel cell 201 where electric power is generated. To further perform hydrodesulfurization in the second desulfurizer 104, part of the generated fuel is supplied to the second desulfurizer 104 through the recycle flow passage 111.

Referring to FIG. 10, when the operation of the fuel cell system 220 is to be stopped, control of the fuel cell system 220 according to Second Example is started (START). The controller 209 executes a step (A) of closing the first shutoff valve 107 and opening the second shutoff valve 108 (step S201).

Then, the controller 209 executes a step (B) of closing the third shutoff valve 112 (step S202). As a result, supply of the hydrogen-containing gas, including steam, to the second desulfurizer 104 through the recycle flow passage 111 is stopped. Thus, in the second desulfurizer 104, the desulfurization function is not developed because the hydrogen-containing gas is not supplied to the second desulfurizer 104. However, because the raw material is supplied through the first desulfurizer 103 with the control of the step S201, the desulfurization function is maintained in the entirety of the fuel cell system.

Since the controller 209 stops the supply of the hydrogen-containing gas to the second desulfurizer 104 in the step S202 while continuing the supply of the raw material through the first desulfurizer 103, a step (F) of purging the inside of the second desulfurizer 104 with the raw material is started. At that time, the reformer 101 continues the generation of the hydrogen-containing gas, and the fuel cell 201 continues the generation of electric power (step S203). In other words, supply of the reaction gas other than the raw material from a reaction gas supplier (not illustrated) to the reformer 101 is continued, whereby the reforming reaction in the reformer 101 is continued and the generation of electric power using the fuel supplied from the reformer 101 is continued by the fuel cell 201.

Then, a target time t1 of the raw material purge for the second desulfurizer 104 is set (step S204). Here, based on an inner volume of the second desulfurizer 104 and a flow rate of the raw material needed to perform the generation of the hydrogen-containing gas in the reformer 101, a time that is least required for inner gas of the second desulfurizer 104 to be replaced with the raw material, e.g., a time during which a total flow rate of the raw material becomes equal to the inner volume of the second desulfurizer 104, is set as the target time t1. While a duration time of the raw material purge is set using a timer in Second Example, the present disclosure is not limited that example. A flow meter may be disposed, and a time least taken until an accumulated value of the flow rate becomes equal to the inner volume of the second desulfurizer 104 may be set as the target time t1.

Then, a raw material purge time t is measured, and it is determined whether the target time t1 has lapsed (step S205). If the raw material purge time t is shorter than t1, the step S205 is continued. If the raw material purge time t is equal to or longer than t1 in the step S205, the controller 14 executes a step (D) of stopping the raw material supplier 102 to stop the supply of the raw material, and closing the second shutoff valve 108 to stop the generation of the hydrogen-containing gas in the reformer 101, thereby stopping the generation of electric power in the fuel cell 201 (steps S206 and S207).

Then, measurement of a temperature of the reformer 101 and a temperature of the fuel cell 201 is started (step S208).

Then, it is determined if both the temperature of the reformer 101 and the temperature of the fuel cell 201 reach a temperature T2 (e.g., 150° C.) or below at which deposition of carbon from the raw material on the reformation catalyst is suppressed (step S209). If higher one T of the temperature of the reformer 101 and the temperature of the fuel cell 201 is not lower than T2, the step S209 is continued.

If it is determined that the higher one T of the temperature of the reformer 101 and the temperature of the fuel cell 201 is equal to or lower than T2, the second shutoff valve 108 is opened (step S210).

Then, a target time t3 of the raw material purge for the reformer 101 and the fuel cell 201 is set (step S211). Here, for example, a time during which a total flow rate of the raw material becomes equal to the sum of respective inner volumes of the reformer 101 and the fuel cell 201, is set as the target time t3. While a duration time of the raw material purge is set using a timer in Second Example, the present disclosure is not limited that example. A flow meter may be disposed, and a time least taken until an accumulated value of the flow rate becomes equal to the sum of respective inner volumes of the reformer 101 and the fuel cell 201 may be set as the target time t3.

Then, a raw material purge time t is measured, and it is determined whether the target time t3 has lapsed (step S212). If the raw material purge time t is shorter than t3, the step S212 is continued. If the raw material purge time t is equal to or longer than t3 in the step S212, the raw material supplier 102 is stopped to stop the supply of the raw material, and the second shutoff valve 108 is closed (step S213).

Then, the control of the fuel cell system 220 according to Second Example is ended (END).

While, in Second Example, the raw material flows into the second desulfurizer after bypassing the first desulfurizer through the second bypass passage or after passing through the first desulfurizer, the present disclosure is not limited to that example. For example, the raw material may flow into the first desulfurizer after bypassing the second desulfurizer through the second bypass passage or after passing through the second desulfurizer.

Second Example can also be modified as in the first embodiment, the second embodiment, the third embodiment, the fourth embodiment, and First Example.

With the configuration of Second Example, when stopping the operation of the fuel cell system, steam remaining in the hydro-desulfurizer can be removed by the raw material purge regardless of the type of the fuel cell unlike the case in which whether to perform the raw material purge of the hydro-desulfurizer or not is determined depending on the type of the fuel cell (in a solid oxide fuel cell, for example, the raw material purge cannot be executed when stopping the operation because carbonization of the raw material occurs depending on the temperature condition, etc.). Accordingly, the operation can be stopped while the activities of the hydrodesulfurization catalyst are maintained.

With the configuration of continuing, in step (F), the generation of the fuel in the reformer and the generation of electric power in the fuel cell at least until the inside of the second desulfurizer is purged with the raw material having passed through the first desulfurizer, the steam remaining in the hydro-desulfurizer, i.e., the second desulfurizer, can be removed more effectively.

With the configuration of executing step (A) to purge the insides of both the second desulfurizer and the reformer with the raw material when the temperature of the reformer drops down to the temperature or lower at which deposition of carbon from the raw material on the reformation catalyst disposed inside the reformer is suppressed, and when the temperature of the fuel cell drops down to the temperature or lower at which deposition of carbon is suppressed, steam remaining in both the reformer and the fuel cell can also be removed without causing decreases in the respective activities of the reformation catalyst and the electrode in the fuel cell. Moreover, since the above-described control is executed in the state where the recycle flow passage is closed, steam remaining in the recycle flow passage is inhibited from flowing into the hydro-desulfurizer, and the amount of water condensed in the hydro-desulfurizer is further reduced.

From the above-described description, many improvements and other various embodiments of the present disclosure are obvious to those skilled in the art. Thus, the above-described description is to be construed in an illustrative sense, and is presented here with intent to teach the best mode for carrying out the present disclosure to those skilled in the art. Details of the structures and/or the functions of the present disclosure can be substantially modified without departing from the gist of the present disclosure.

Embodiments of the present disclosure are usefully practiced as the hydrogen generating apparatus, the fuel cell system, and the method for operating the apparatus and the system, which can reduce a decrease in the activities of a hydrodesulfurization catalyst.

What is claimed is:

1. A hydrogen generating apparatus comprising:
   a reformer that generates hydrogen-containing gas through a reforming reaction;
   a raw material supplier that supplies a raw material to the reformer;
   a reaction gas supplier that supplies reaction gas other than the raw material to the reformer;
   a hydro-desulfurizer that removes a sulfur compound in the raw material supplied to the reformer;
   a recycle flow passage through which part of the hydrogen-containing gas generated by the reformer is supplied to the hydro-desulfurizer;
   a closing device that closes the recycle flow passage; and
   a controller configured to, when stopping operation of the hydrogen generating apparatus so that a temperature of the reformer begins to decrease, close the closing device and control the raw material supplier and the reaction gas supplier such that the raw material and the reaction gas other than the raw material are supplied to the reformer, before the temperature of the reformer drops down to a temperature at which deposition of carbon from the raw material on a reformation catalyst disposed inside the reformer is suppressed.

2. The hydrogen generating apparatus of claim 1, wherein the hydro-desulfurizer includes therein a hydrodesulfurization catalyst, the hydrodesulfurization catalyst being a catalyst that adsorptively removes the sulfur compound in the raw material even when the hydrogen-containing gas is not supplied through the recycle flow passage.

3. The hydrogen generating apparatus of claim 1, further comprising:
   an adsorbent desulfurizer that adsorptively removes the sulfur compound in the raw material upstream of the hydro-desulfurizer;
   a first material supplying passage through which the raw material supplied to the reformer via the adsorbent desulfurizer and the hydro-desulfurizer flows;
   a second material supplying passage through which the raw material supplied to the reformer via the hydro-desulfurizer, but not via the adsorbent desulfurizer, flows; and
   a switching device that switches over the first material supplying passage and the second material supplying passage,
   wherein, when stopping the operation of the hydrogen generating apparatus, the controller switches over the switching device such that the raw material flows through the first material supplying passage, closes the closing device, and controls the raw material supplier and the reaction gas supplier such that the raw material and the reaction gas other than the raw material are supplied to the reformer, before the temperature of the reformer drops down to the temperature at which deposition of carbon from the raw material on the reformation catalyst disposed inside the reformer is suppressed.

4. The hydrogen generating apparatus of claim 1, wherein, when stopping the operation of the hydrogen generating apparatus, the controller controls the raw material supplier and the reaction gas supplier such that, at least until inside of the hydro-desulfurizer is purged with the raw material, the raw material and the reaction gas other than the raw material are supplied to the reformer, before the temperature of the reformer drops down to the temperature at which deposition of carbon from the raw material on the reformation catalyst disposed inside the reformer is suppressed.

5. The hydrogen generating apparatus of claim 1, wherein, after executing the aforesaid control, when a temperature of the reformation catalyst disposed inside the reformer becomes the temperature at which deposition of carbon from the raw material is suppressed, the controller controls the raw material supplier to purge inside of the reformer with the raw material.

6. A fuel cell system comprising:
   the hydrogen generating apparatus of claim 1; and
   a fuel cell that generates electric power by employing the hydrogen-containing gas supplied from the hydrogen generating apparatus.

7. A fuel cell system comprising:
   the hydrogen generating apparatus of claim 5; and
   a fuel cell that generates electric power by employing the hydrogen-containing gas supplied from the hydrogen generating apparatus,
   wherein, when inside of the reformer is purged with the raw material, the raw material having passed through the reformer is supplied to the fuel cell to purge inside of the fuel cell with the raw material.

8. The fuel cell system of claim 6, further comprising a power conditioner that conditions electric power generated by the fuel cell,
   wherein the controller controls the power conditioner such that the fuel cell generates electric power, in a state where, when stopping operation of the fuel cell system, the controller closes the closing device and controls the raw material supplier and the reaction gas supplier such that the raw material and the reaction gas other than the raw material are supplied to the reformer, before the temperature of the reformer drops down to the temperature at which deposition of carbon from the raw material on the reformation catalyst disposed inside the reformer is suppressed.

9. A method for operating a hydrogen generating apparatus, the method comprising:
   a step (a) of, when stopping operation of the hydrogen generating apparatus so that a temperature of a reformer begins to decrease, closing a recycle flow passage through which part of hydrogen-containing gas generated in the reformer through a reforming reaction is supplied to a hydro-desulfurizer, and supplying a raw material to the hydro-desulfurizer, before the temperature of the reformer drops down to a temperature at which deposition of carbon from the raw material on a reformation catalyst disposed inside the reformer is suppressed; and
   a step (b) of, during execution of the step (a), supplying the raw material having passed through the hydro-desulfurizer and reaction gas other than the raw material to the reformer, and generating the hydrogen-containing gas.

10. The method for operating the hydrogen generating apparatus of claim 9, wherein the hydro-desulfurizer includes therein a hydrodesulfurization catalyst, the hydrodesulfurization catalyst being a catalyst that adsorptively removes a sulfur compound in the raw material even when the hydrogen-containing gas is not supplied through the recycle flow passage.

11. The method for operating the hydrogen generating apparatus of claim 9, wherein, in the step (a), the raw material passes through an adsorbent desulfurizer before passing through the hydro-desulfurizer.

12. The method for operating the hydrogen generating apparatus of claim 9, wherein the step (b) is executed at least until inside of the hydro-desulfurizer is purged with the raw material.

13. The method for operating the hydrogen generating apparatus of claim 9, further comprising a step (c) of purging inside of the reformer with the raw material when the temperature of the reformer drops down to the temperature or below at which deposition of carbon from the raw material on the reformation catalyst disposed inside the reformer is suppressed, after executing the steps (a) and (b).

14. A method for operating a fuel cell system, the method comprising:
a step (a) of, when stopping operation of the fuel cell system so that a temperature of a reformer begins to decrease, closing a recycle flow passage through which part of hydrogen-containing gas generated in the reformer through a reforming reaction is supplied to a hydro-desulfurizer, and supplying a raw material to the hydro-desulfurizer, before the temperature of the reformer drops down to a temperature at which deposition of carbon from the raw material on a reformation catalyst disposed inside the reformer is suppressed; and
a step (b) of, during execution of the step (a), supplying the raw material having passed through the hydro-desulfurizer and reaction gas, which is used for the reforming reaction, other than the raw material to the reformer, and generating the hydrogen-containing gas.

15. The method for operating the fuel cell system of claim 14, further comprising a step (c) of generating electric power in a fuel cell during execution of the step (b).

16. The method for operating the fuel cell system of claim 14, further comprising a step (c) of purging insides of the reformer and the fuel cell with the raw material when the temperature of the reformer drops down to the temperature or below at which deposition of carbon from the raw material on the reformation catalyst disposed inside the reformer is suppressed, after executing the steps (a) and (b).

* * * * *